United States Patent
Mikura et al.

(10) Patent No.: US 9,016,769 B2
(45) Date of Patent: Apr. 28, 2015

(54) SADDLE TYPE VEHICLE

(71) Applicant: Honda Motor Co., Ltd., Tokyo (JP)

(72) Inventors: Keita Mikura, Wako (JP); Taro Nishimoto, Wako (JP); Eiji Sugiyama, Wako (JP); Tomiji Niitsu, Wako (JP); Hisashi Kadomasu, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/177,304

(22) Filed: Feb. 11, 2014

(65) Prior Publication Data
US 2014/0225398 A1 Aug. 14, 2014

(30) Foreign Application Priority Data

Feb. 14, 2013 (JP) ................................. 2013-026967

(51) Int. Cl.
| B62D 25/08 | (2006.01) |
| B62J 6/02 | (2006.01) |
| B62J 17/02 | (2006.01) |
| B62J 25/00 | (2006.01) |
| B62J 29/00 | (2006.01) |
| B62K 19/46 | (2006.01) |

(52) U.S. Cl.
CPC .. *B62J 6/02* (2013.01); *B62J 17/02* (2013.01); *B62J 25/00* (2013.01); *B62J 29/00* (2013.01); *B62K 19/46* (2013.01)

(58) Field of Classification Search
CPC ............ B62J 25/00; B62J 29/00; B62K 19/46
USPC ................................ 296/180.1, 192; 180/219
See application file for complete search history.

(56) References Cited

U.S. PATENT DOCUMENTS

| 8,083,017 | B2 * | 12/2011 | Arimura ....................... 180/219 |
| 8,267,460 | B2 * | 9/2012 | Kurihara ...................... 296/78.1 |
| 2006/0006016 | A1 * | 1/2006 | Nishizawa .................... 180/219 |
| 2012/0111651 | A1 * | 5/2012 | Irie et al. ...................... 180/65.1 |
| 2013/0249239 | A1 * | 9/2013 | Yokouchi et al. .......... 296/180.1 |
| 2013/0270940 | A1 * | 10/2013 | Matsuda ......................... 310/64 |

FOREIGN PATENT DOCUMENTS

JP 2005-125842 A 5/2005

* cited by examiner

*Primary Examiner* — Lori L Lyjak
(74) *Attorney, Agent, or Firm* — Westerman, Hattori, Daniels & Adrian, LLP

(57) ABSTRACT

A saddle type vehicle is provided wherein, even where an accommodating portion is provided on a front cowl, a wind inlet portion for a screen can be readily formed centrally in a vehicle widthwise direction and an aerodynamic property and a cooling performance can be assured suitably. The saddle type vehicle includes a vehicle body frame, a steering shaft supported for rotation at a front end of the vehicle body frame and configured to steer a front wheel, a front cowl disposed around the steering shaft and covering a front portion of a vehicle body, and a pair of accommodation portions provided on the front cowl. The accommodation portions are disposed in left and right pair. A wind inlet portion of a screen provided so as to be erected uprightly from the front cowl is disposed between the left and right accommodation portions.

19 Claims, 21 Drawing Sheets

SADDLE TYPE VEHICLE

The present application claims priority under 35 U.S.C. §119 to Japanese Patent Application No. 2013-026967, filed Feb. 14, 2013, the contents of which is incorporated herein, by reference, in its entirety.

TECHNICAL FIELD

The present invention relates to a saddle type vehicle.

BACKGROUND OF THE INVENTION

A motorcycle wherein an accommodating portion is provided on a front cowl is conventionally known (refer to, for example, Japanese Patent Laid-Open No. 2005-125842). Further, in some motorcycles, a wind inlet portion for a windscreen, provided above a front cowl, is formed in the front cowl or between the front cowl and the windscreen.

SUMMARY OF THE INVENTION

A wind inlet portion for a screen is formed in order to moderate the pressure difference between an occupant and a front cowl which is generated upon high speed traveling of a motorcycle. The wind inlet portion is preferably formed at the center in a vehicle widthwise direction in terms of the aerodynamic performance. Further, the wind inlet portion is sometimes used to cool a part disposed centrally in the vehicle widthwise direction. It is an effective layout that the wind inlet portion is disposed centrally in the vehicle widthwise direction.

However, in the structure disclosed in Japanese Patent Laid-Open No. 2005-125842, the accommodating portion provided on the front cowl is positioned centrally in the vehicle widthwise direction. Therefore, it is difficult to form the wind inlet portion for the windscreen disposed above the accommodating portion centrally in the vehicle widthwise direction. More particularly, in order to form the wind inlet portion centrally in the vehicle widthwise direction in the structure described above, it is necessary to take, for example, a waterproof property and so forth for the accommodating portion into consideration. Therefore, there is the possibility that the structure of the wind inlet portion may be complicated.

A saddle type vehicle is herein provided wherein, even where an accommodating portion is provided on a front cowl, a wind inlet portion for a screen can be readily formed centrally in a vehicle widthwise direction and an aerodynamic property and a cooling performance can be assured suitably.

According to a first feature, there is provided a saddle type vehicle including: a vehicle body frame; a steering shaft supported for rotation at a front end of the vehicle body frame and configured to steer a front wheel; a front cowl disposed around the steering shaft and covering a front portion of a vehicle body; and a pair of accommodation portions provided in the front cowl. The accommodation portions are disposed in a left and right pair. A wind inlet portion of a windscreen provided so as to be erected uprightly from the front cowl is disposed between the left and right accommodation portions.

According to a second feature, the saddle type vehicle according to claim 1 is configured such that the accommodation portions include recessed portions formed in the front cowl and recessed downwardly to form accommodation spaces, and lids mounted for opening and closing movement and configured to cover the recessed portions from above.

According to a third feature, the saddle type vehicle according to the second feature is configured such that the lids are mounted for opening and closing movement by hinges provided on inner walls of the recessed portions positioned on the inner side in a vehicle widthwise direction.

According to a fourth feature, the saddle type vehicle according to the first to third features is configured such that the accommodation portions are formed such that the dimension thereof in the vehicle widthwise direction increases toward the rear as viewed in top plan, and side mirrors are attached to the front cowl behind rear portions of the accommodation portions.

According to a fifth feature, the saddle type vehicle according to the first to fourth features is configured such that a seat is disposed behind the front cowl, and the front cowl has, at a rear end thereof, a cowl extending portion which extends to a front end of the seat.

According to a sixth feature, the saddle type vehicle according to the first to fifth features is configured such that a side stand is provided on one of the left and the right in the vehicle widthwise direction, and an electric component is disposed in that one of the left and right accommodation portions which is on the side on which the side stand is provided.

With the first feature, even where the accommodation portions are disposed so as to be distributed to the left and the right in the front cowl to provide the accommodation portions on the front cowl, the wind inlet portion can be formed readily at a central position in the vehicle widthwise direction between the left and right accommodation portions. Consequently, an aerodynamic performance and a cooling performance can be assured favorably.

With the second feature, the lids since can be opened to open the accommodation spaces upwardly, the operability of the accommodation portions can be promoted.

With the third feature, the lids can be opened or closed by the hinges provided on the inner walls of the recessed portions positioned on the inner side in the vehicle widthwise direction. Therefore, the lids can be opened and closed from the outer sides in the vehicle widthwise direction. Consequently, the operability of the accommodation portions can be improved.

With the fourth feature, the outer shape of the front cowl can be made a streamlined shape from the side to the rear of the accommodation portions so as to suppress the aerodynamic drag. Further, since the side mirrors are attached to the positions spaced to the left and the right from the center in the vehicle widthwise direction, the visibility of the side mirrors can be assured. Further, since the side mirrors are attached efficiently utilizing part of the front cowl, for example, stays for the side mirrors can be eliminated to achieve reduction of the number of parts and miniaturization. Further, also it is possible to cause outer side portions of the front cowl in the vehicle widthwise direction to function as knuckle guards. Consequently, the number of parts can be reduced and an impact can be provided to the design.

With the fifth feature, since the front cowl extends from the front of the vehicle body to the seat, an impact can be provided to the design.

With the sixth feature, when the vehicle tilts to one of the left and the right in the vehicle widthwise direction by being supported by the side stand, the operability when maintenance of the electric component is carried out on the tilted side can be improved.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
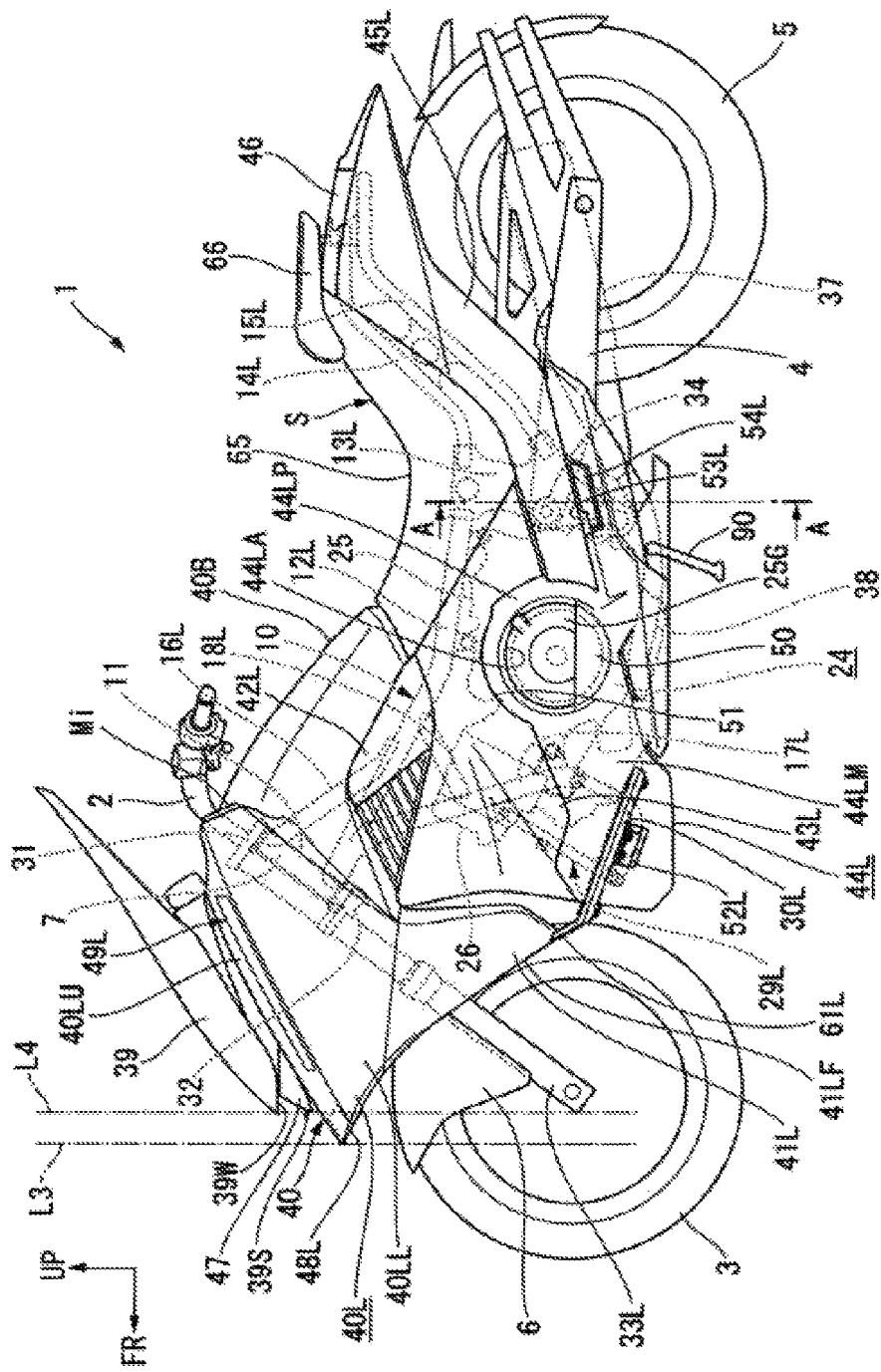
FIG. 1 is a left side elevational view of a motorcycle according to a first embodiment of the present invention.

In the following, an embodiment of the present invention is described with reference to the drawings. It is to be noted that, in the drawings referred to in the following description, an arrow mark FR denotes a forward direction of the vehicle, an arrow mark UP denotes an upward direction of the vehicle, and an arrow mark LH denotes a leftward direction of the vehicle. FIGS. 1 to 6 show six figures of a motorcycle 1 as a saddle type vehicle according to the present embodiment, and FIGS. 7 to 9 show a left side elevational view, a front elevational view and a top plan view of a vehicle body frame 10 of the motorcycle 1, respectively.

Referring first to FIGS. 1 to 6, the motorcycle 1 according to the present embodiment includes a front wheel 3 steered by a handlebar 2 and a rear wheel 5 supported by a swing arm 4. Steering system parts including the handlebar 2 and the front wheel 3 are supported for pivotal steering operation on a head pipe 11 at the front end of the vehicle body frame 10. The swing arm 4 is supported at a front portion thereof for pivotal motion and upward and downward rocking motion on the rear side of a lower portion of the vehicle body frame 10.

Figure 7:
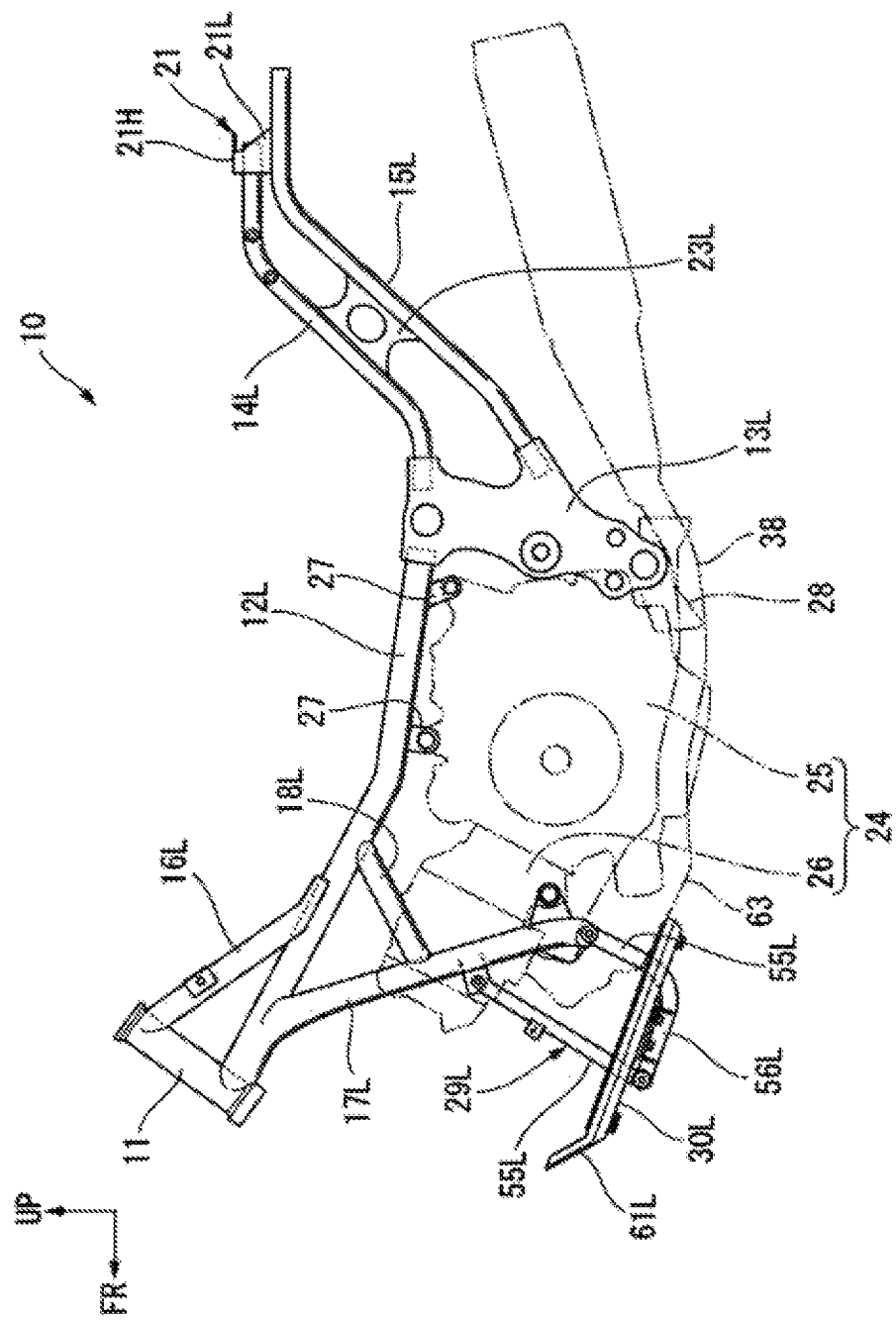
FIG. 7 is a left side elevational view of a vehicle body frame of the motorcycle.
Figure 8:
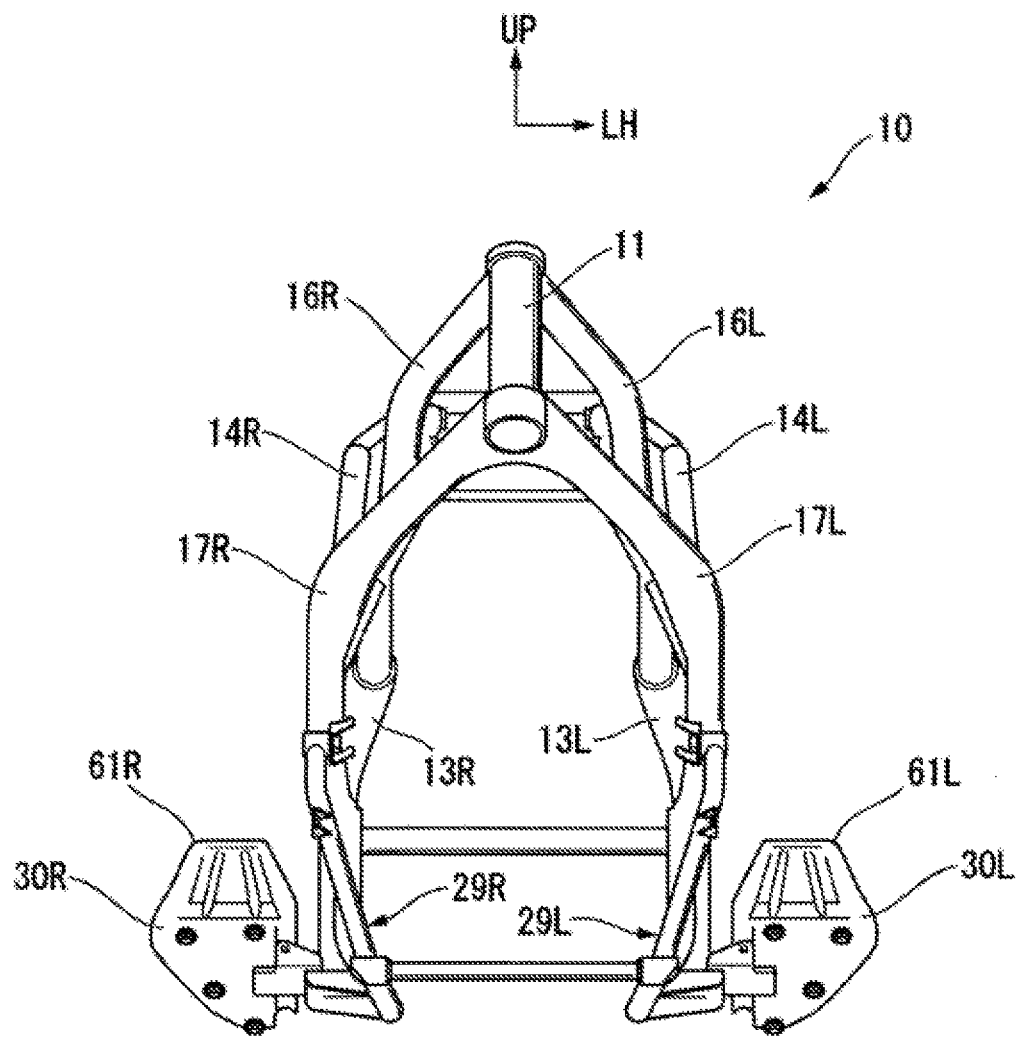
FIG. 8 is a front elevational view of the vehicle body frame of the motorcycle.
Figure 9:
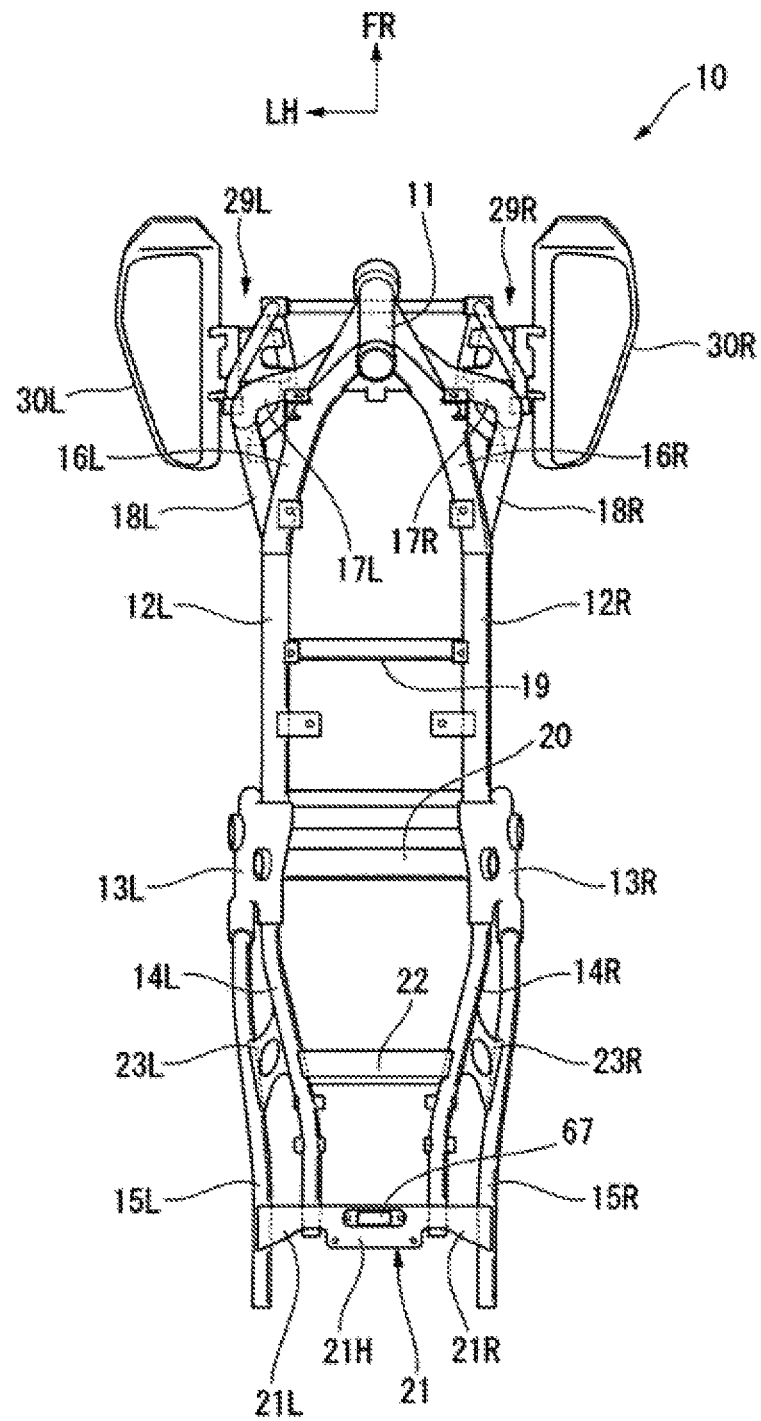
FIG. 9 is a top plan view of the vehicle body frame of the motorcycle.
Figure 10:
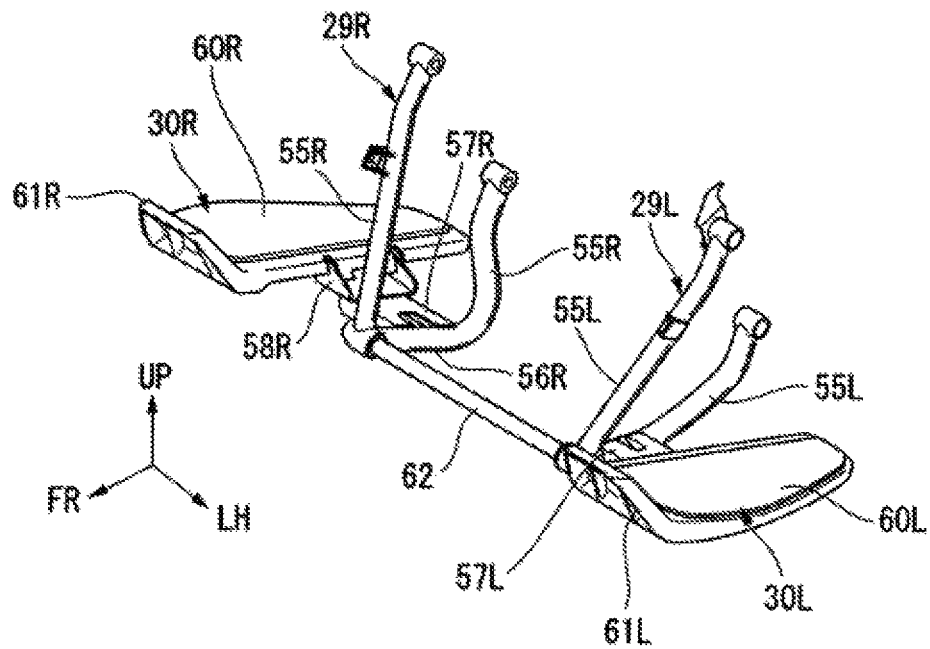
FIG. 10 is a perspective view of steps for a rider of the motorcycle and sub frames which support the steps.
Figure 11:
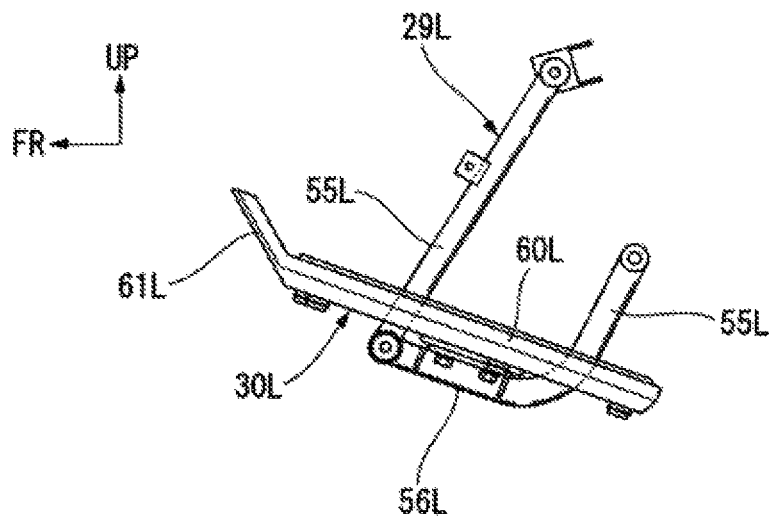
FIG. 11 is a left side elevational view of one of the steps.

Referring to FIGS. 7 to 9, the vehicle body frame 10 is configured, for example, from a plurality of kinds of steel members joined integrally by welding or the like. The vehicle body frame 10 includes the head pipe 11, a pair of left and right main frames 12L and 12R, a pair of left and right pivot frames 13L and 13R, a pair of left and right seat frames 14L and 14R and a pair of left and right rear frames 15L and 15R. The vehicle body frame 10 further includes a pair of left and right gusset frames 16L and 16R, a pair of left and right engine hangers 17L and 17R, and a pair of left and right support frames 18L and 18R. The head pipe 11 is positioned at a front end portion of the vehicle body frame 10. The main frames 12L and 12R extend in a leftwardly and rightwardly branching state obliquely downwardly rearwardly from a lower portion of the head pipe 11. The pivot frames 13L and 13R extend downwardly from rear portions of the main frames 12L and 12R, respectively. The seat frames 14L and 14R extend obliquely upwardly rearwardly from upper portions of the pivot frames 13L and 13R, respectively. The rear frames 15L and 15R extend obliquely upwardly rearwardly from substantially central portions of the pivot frames 13L and 13R in an upward and downward direction, respectively, and the entire rear frames 15L and 15R are positioned below the seat frames 14L and 14R, respectively. The gusset frames 16L and 16R extend obliquely downwardly rearwardly in a leftwardly and rightwardly branching state from an upper portion of the head pipe 11 and connect to the main frames 12L and 12R, respectively. The engine hangers 17L and 17R extend obliquely downwardly rearwardly from front portions of the main frames 12L and 12R, respectively. The support frames 18L and 18R extend obliquely upwardly rearwardly from substantially central portions of the engine hangers 17L and 17R in the upward and downward direction, respectively, and connect to the main frames 12L and 12R, respectively.

The seat frames 14L and 14R and the rear frames 15L and 15R are formed such that they first extend obliquely upwardly rearwardly from the pivot frames 13L and 13R, respectively, and further extend at rear portions thereof substantially horizontally. Further, as viewed in top plan, the seat frames 14L and 14R extend in a region on the inner side of the rear frames 15L and 15R in the vehicle widthwise direction (refer to FIG. 9).

The frames of the vehicle body frame 10 configured in left and right pair are connected to each other at suitable locations by cross frames. Referring to FIG. 9, in the motorcycle 1 of the present embodiment, substantially middle portions of the main frames 12L and 12R in the forward and backward direction are connected to each other by an engine upper side cross frame 19. Upper portions of the pivot frames 13L and 13R are connected to each other by a central cross frame 20.

Further, rear portions of the seat frames 14L and 14R and the rear frames 15L and 15R are connected to each other by a seat cross frame 21. Referring also to FIG. 7, the seat cross frame 21 has a pair of left and right leg portions 21L and 21R and a horizontally extending portion 21H. The leg portions 21L and 21R extend obliquely upwardly from the rear frames 15L and 15R toward the seat frames 14L and 14R, respectively. The horizontally extending portion 21H connects the leg portions 21L and 21R to each other. The horizontally extending portion 21H extends in the leftward and rightward direction substantially horizontally.

Further, in front of the seat cross frame 21, the seat frames 14L and 14R extend in an inclined state, and substantially central portions of the inclined portions of the seat frames 14L and 14R in the forward and backward direction are connected to each other by a rear portion cross frame 22. Further, the inclined portions of the seat frames 14L and 14R and the rear frames 15L and 15R are connected to each other by a pair of left and right connecting plates 23L and 23R, respectively. The connecting plates 23L and 23R extend in the upward and downward direction.

Figure 2:
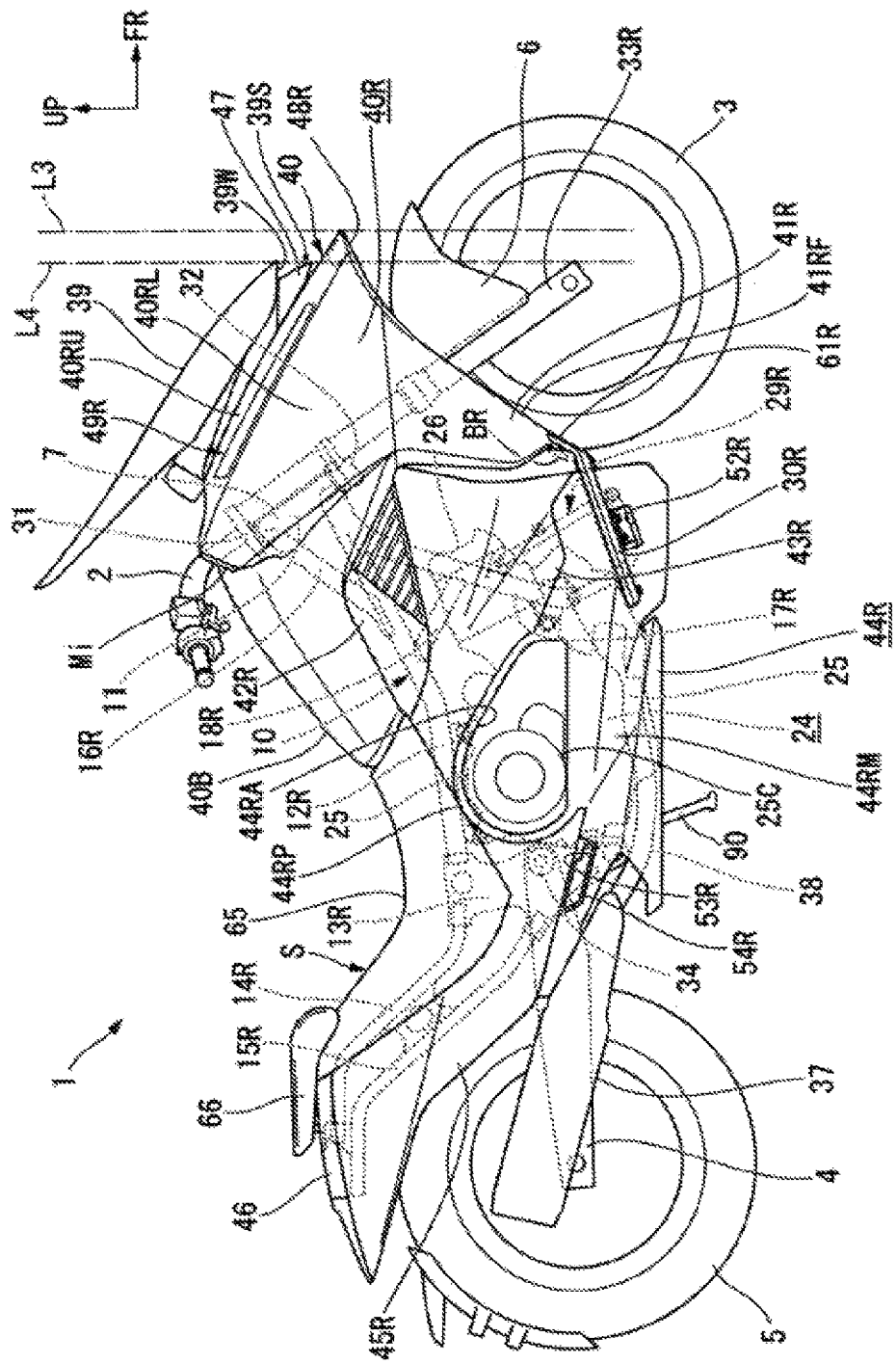
FIG. 2 is a right side elevational view of the motorcycle.

Referring to FIGS. 1, 2 and 7, an engine 24 is disposed below the main frames 12L and 12R. The engine 24 includes a crankcase 25, and a cylinder portion 26 projecting obliquely forwardly upwardly from a front portion of the crankcase 25. Referring to FIG. 7, the engine 24 is supported, on the lower side of a base end portion of the cylinder portion 26 thereof, by the engine hangers 17L and 17R. Further, the engine 24 is supported, at an upper portion of the crankcase 25 thereof, by upper engine hangers 27 provided in a front and rear pair at rear portions of the main frames 12L and 12R. Furthermore, the engine 24 is supported, on the lower side of a rear portion of the crankcase 25 thereof, by a rear engine hanger 28 (indicated by an alternate long and two short dashes line) provided between lower end portions of the pivot frames 13L and 13R.

The engine hangers 17L and 17R extend along the outer sides of the cylinder portion 26 in the vehicle widthwise direction to a position below the cylinder portion 26. A shaft member (not shown) extending in the vehicle widthwise direction bridges lower end portions of the engine hangers 17L and 17R and supports the lower side of a base end portion of the cylinder portion 26. A pair of left and right sub frames 29L and 29R are connected to the engine hangers 17L and 17R, respectively, such that they extend obliquely forwardly downwardly. A left step 30L is secured to the sub frame 29L while a right step 30R is secured to the sub frame 29R. Details of the sub frames 29L and 29R and the left and right steps 30L and 30R are hereinafter described.

The handlebar 2 is secured to a top bridge 31 provided at a portion of a steering shaft 7 and extending in the vehicle widthwise direction. The steering shaft 7 is fitted in the head pipe 11 and projects upwardly from the head pipe 11. Further, a bottom bridge 32 is provided at a portion of the steering shaft 7 which projects downwardly from the head pipe 11, and extends in the vehicle widthwise direction. A pair of left and right front forks 33L and 33R are secured to the top bridge 31 and the bottom bridge 32 and extend obliquely forwardly downwardly from the head pipe 11 side. The front wheel 3 is supported for rotation between lower portions of the front forks 33L and 33R. A front fender 6 is provided on the front forks 33L and 33R and covers the front wheel 3 from above.

Figure 6:
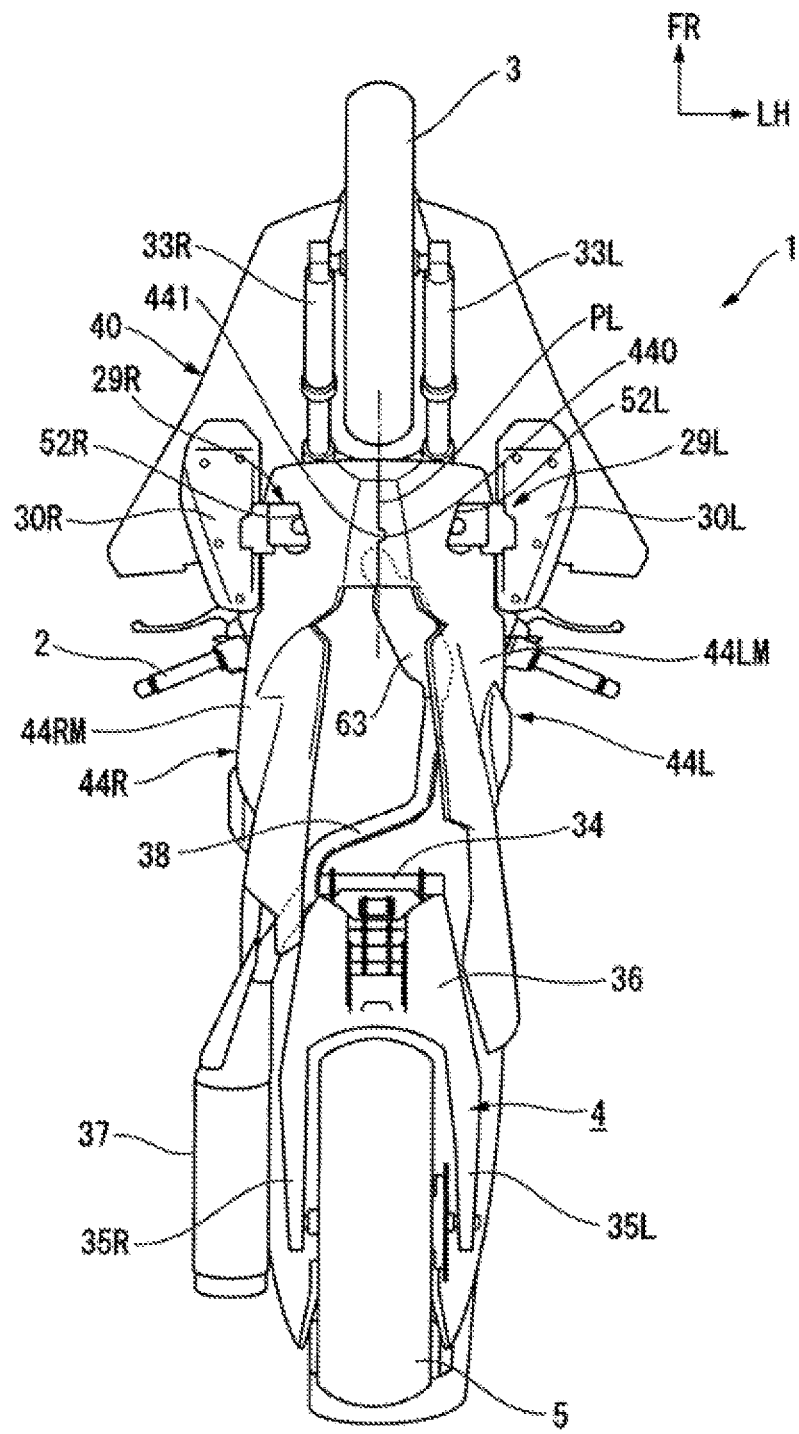
FIG. 6 is a bottom plan view of the motorcycle.

A pivot shaft 34 bridges substantially central portions of the pivot frames 13L and 13R in the upward and downward direction. The swing arm 4 is supported at a front portion thereof for upward and downward rocking motion on the pivot shaft 34. Referring to FIG. 6, the swing arm 4 has a pair of left and right arm portions 35L and 35R and a connecting portion 36 formed integrally with each other thereon. The arm portions 35L and 35R extend in the forward and backward direction. The connecting portion 36 connects front portions of the arm portions 35L and 35R to each other. A supporting portion of the connecting portion 36 is supported by the pivot shaft 34. Further, a muffler 37 is disposed, for example, on the right side of the right arm portion 35R. An exhaust pipe 38 extends from the cylinder portion 26. The exhaust pipe 38 is connected at a substantially middle position thereof in the vehicle widthwise direction to the cylinder portion 26, extends rearwardly in a curved state and is connected at a rear end thereof to the muffler 37.

Cowl members which are exterior parts are described. The motorcycle 1 of the present embodiment includes a front cowl 40, a pair of left and right front side cowls 41L and 41R, and a pair of left and right air guide covers 42L and 42R. The motorcycle 1 further includes a pair of left and right center side cowls 43L and 43R, a pair of left and right under cowls 44L and 44R, a pair of left and right rear side cowls 45L and 45R, and a rear cowl 46. The front cowl 40 extends from a location above the front wheel 3 to a substantially middle location in the forward and backward direction of the vehicle and covers a front portion of the vehicle body over a wide range. The front side cowls 41L and 41R connect to the front side of left and right lower portions of the front cowl 40 in the upward and downward direction, respectively, and extend downwardly. The air guide covers 42L and 42R connect to the rear side of the left and right lower portions of the front cowl 40 in the upward and downward direction, respectively, and extend downwardly. The center side cowls 43L and 43R connect to lower portions of the air guide covers 42L and 42R in the upward and downward direction, respectively, and extend downwardly. The under cowls 44L and 44R connect to lower portions of the center side cowls 43L and 43R in the upward and downward direction, respectively, and extend downwardly in such a manner as to go round the lower side of the engine 24. The rear side cowls 45L and 45R connect to the upper side of rear portions of the under cowls 44L and 44R in the upward and downward direction, respectively, and extend obliquely upwardly rearwardly. The rear cowl 46 is disposed across rear portions of the rear side cowls 45L and 45R.

Figure 5:
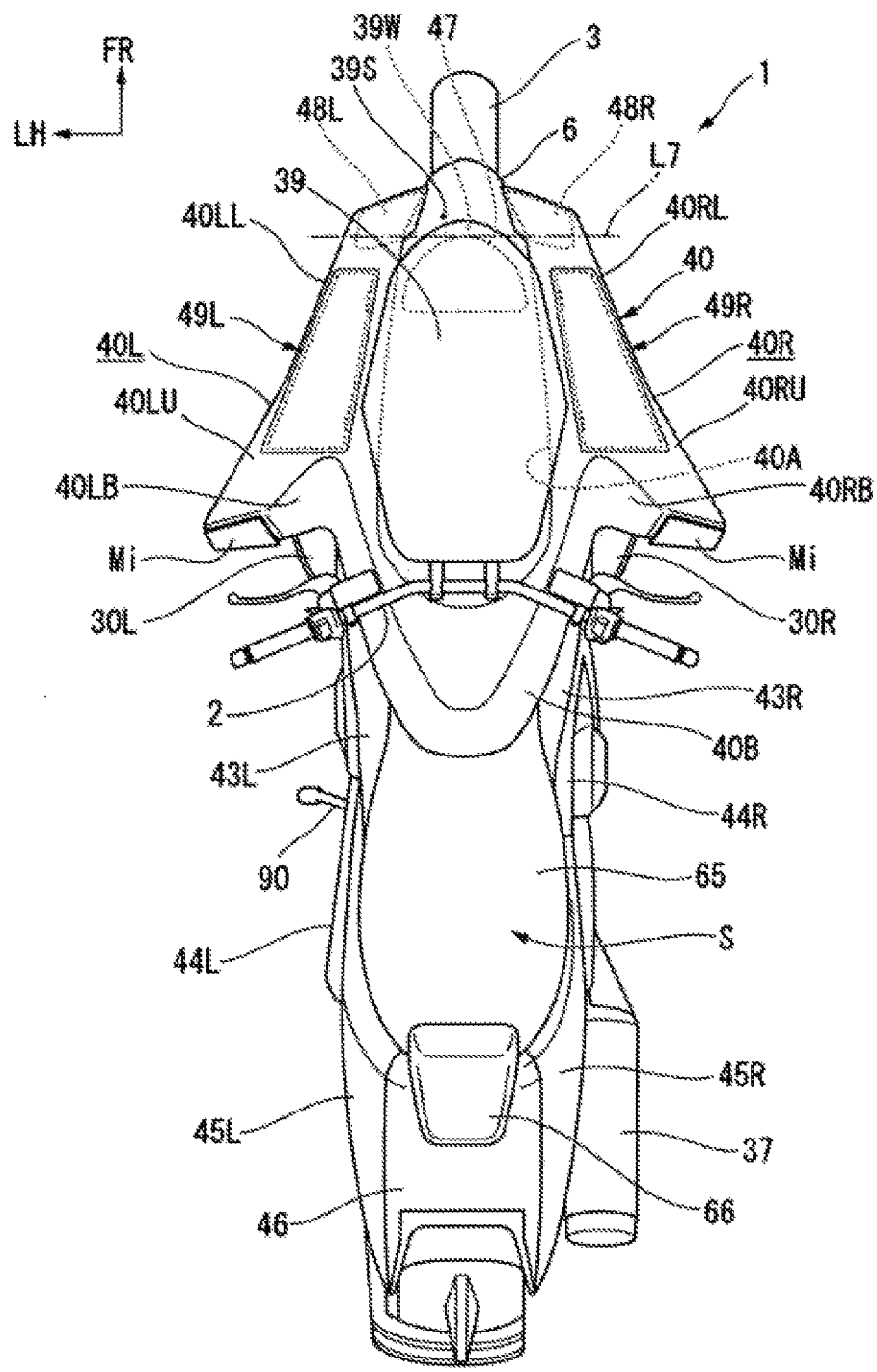
FIG. 5 is a top plan view of the motorcycle.

Referring to FIG. 5, the front cowl 40 is cut out from the front side as viewed in top plan such that it forms a cutout portion 40A extending rearwardly along the forward and backward direction on the center in the vehicle widthwise direction. The head pipe 11 (steering shaft 7) is disposed so as to be positioned in the inner side of the cutout portion 40A and the front cowl 40 covers the head pipe 11 from the left and right and from the rear. In particular, the front cowl 40 has a left side portion 40L, a right side portion 40R, and a rear portion 40B. The left side portion 40L extends in the forward and backward direction on the left side of the head pipe 11 and covers the head pipe 11 from the left. The right side portion 40R extends in the forward and backward direction on the right side of the head pipe 11 and covers the head pipe 11 from the right. The rear portion 40B is formed integrally with the left side portion 40L and the right side portion 40R and covers the head pipe 11 from the rear.

The shape of the front cowl 40 is described more particularly. In the present embodiment, as viewed in top plan, the left side portion 40L and the right side portion 40R are formed such that they extend to the outer sides in the vehicle widthwise direction toward the rear. The front cowl 40 is formed in a streamlined shape.

The left side portion 40L integrally has a side wall portion 40LL, an upper wall portion 40LU and a rear wall portion 40LB. The side wall portion 40LL extends in the forward and backward direction and the upward and downward direction in such a manner as to cover the head pipe 11 and so forth from the outer side in the vehicle widthwise direction. Further, the side wall portion 40LL is formed in a tapering shape toward the front as viewed in side elevation. The upper wall portion 40LU extends from an upper edge of the side wall portion 40LL to the inner side in the vehicle widthwise direction. The upper wall portion 40LU is formed in an elongated state in the forward and backward direction as viewed in top plan such that it covers a space, which extends in the vehicle widthwise direction and the forward and backward direction between the side wall portion 40LL and the head pipe 11, from above. The rear wall portion 40LB extends in the upward and downward direction such that it connects a rear edge of the side wall portion 40LL and a rear edge of the upper wall portion 40LU to each other.

Similarly, the right side portion 40R integrally has a side wall portion 40RL, an upper wall portion 40RU and a rear wall portion 40RB. The side wall portion 40RL extends in the forward and backward direction and the upward and downward direction in such a manner as to cover the head pipe 11 and so forth from the outer side in the vehicle widthwise direction. The side wall portion 40RL is formed in a tapering state toward the front as viewed in side elevation. The upper wall portion 40RU extends from an upper edge of the side wall portion 40RL toward the inner side in the vehicle widthwise direction. The upper wall portion 40RU is formed in a forwardly and rearwardly elongated shape as viewed in side elevation such that it covers a space, which extends in the vehicle widthwise direction and the forward and backward direction between the side wall portion 40RL and the head pipe 11, from above. The rear wall portion 40RB extends in the upward and downward direction such that it connects a rear edge of the side wall portion 40RL and a rear edge of the upper wall portion 40RU to each other.

As viewed in side elevation, upper edges of the left side wall portion 40LL and the right side wall portion 40RL extend obliquely upwardly rearwardly from a tip end toward the rear. Also the left upper wall portion 40LU and the right upper wall portion 40RU which extend from the upper edges of the left and right side wall portions 40LL and 40RL to the inner side in the vehicle widthwise direction extend obliquely upwardly rearwardly from a tip end toward the rear. Further, as viewed in top plan, the left upper wall portion 40LU and the right upper wall portion 40RU are formed such that they extend to the outer sides in the vehicle widthwise direction toward the rear. Besides, in the present embodiment, the left upper wall portion 40LU and the right upper wall portion 40RU are formed such that the outer side edges thereof in the vehicle widthwise direction extend by a greater amount to the outer sides in the vehicle widthwise direction toward the rear than the inner side edges thereof in the vehicle widthwise direction. Further, the left upper wall portion 40LU and the right upper wall portion 40RU are formed such that the dimensions in the vehicle widthwise direction of the inner side edges in the vehicle widthwise direction and the outer side edges in the vehicle widthwise direction increase toward the rear.

Figure 4:
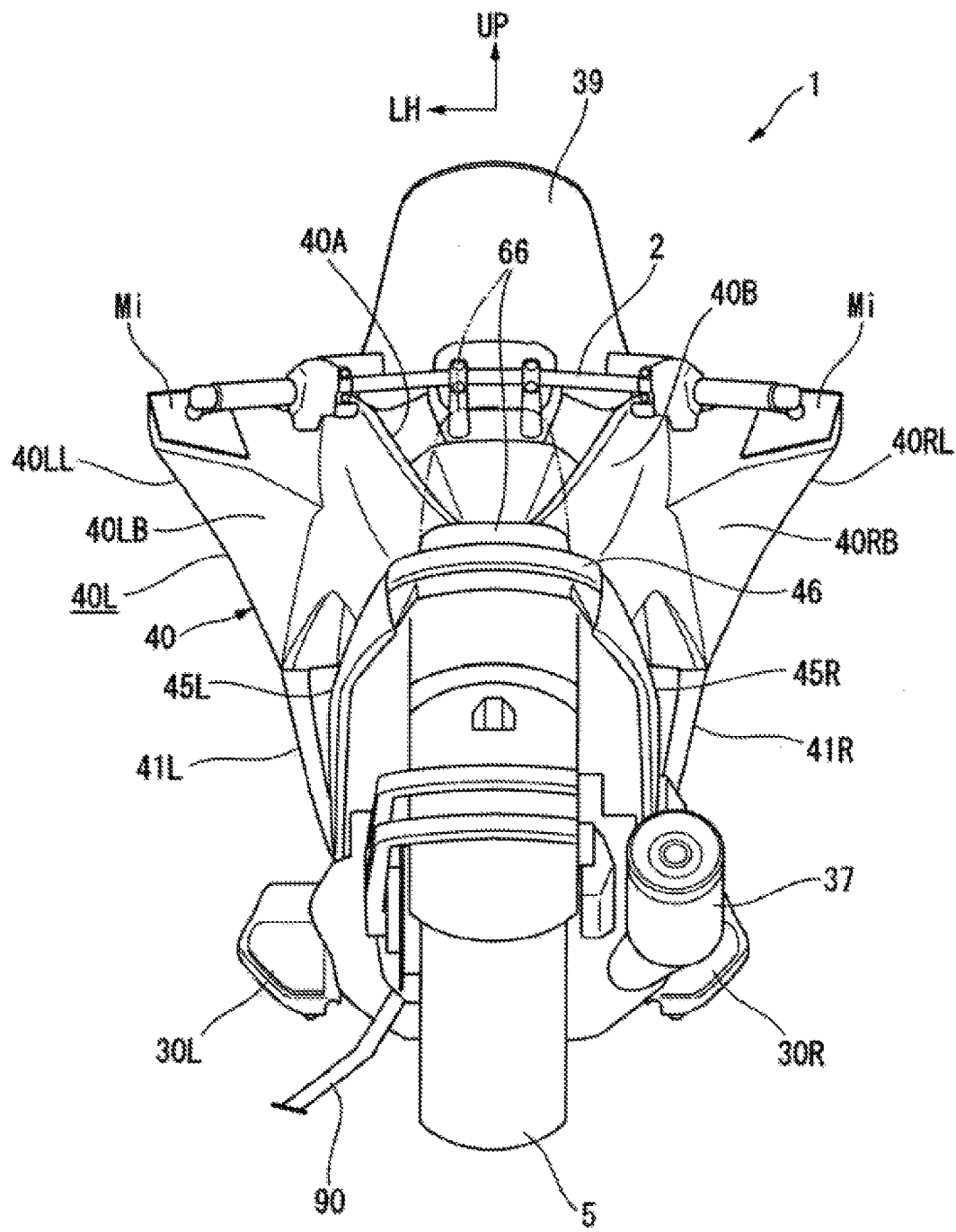
FIG. 4 is a rear elevational view of the motorcycle.

The left side wall portion 40LL and the right side wall portion 40RL are formed such that they extend, on the front portion side thereof, downwardly along a substantially upward and downward direction from the upper wall portion 40LU and the upper wall portion 40RU, respectively. Further, the left side wall portion 40LL and the right side wall portion 40RL are formed such that they are recessed, on the rear portion side thereof, to the inner side in the vehicle widthwise direction toward the lower side. Therefore, the front cowl 40 is shaped such that rear portions of the left side portion 40L and the right side portion 40R are raised steeply to the outer sides in the vehicle widthwise direction with respect to the front portion side. Referring to FIG. 4, the left rear wall portion 40LB and the right rear wall portion 40RB are formed such that the rear portion side of the left side wall portion 40LL and the right side wall portion 40RL is recessed to the inner side in the vehicle widthwise direction toward the lower side. Therefore, the left rear wall portion 40LB and the right rear wall portion 40RB have a triangular shape which tapers downwardly as viewed in rear elevation.

Figure 3:
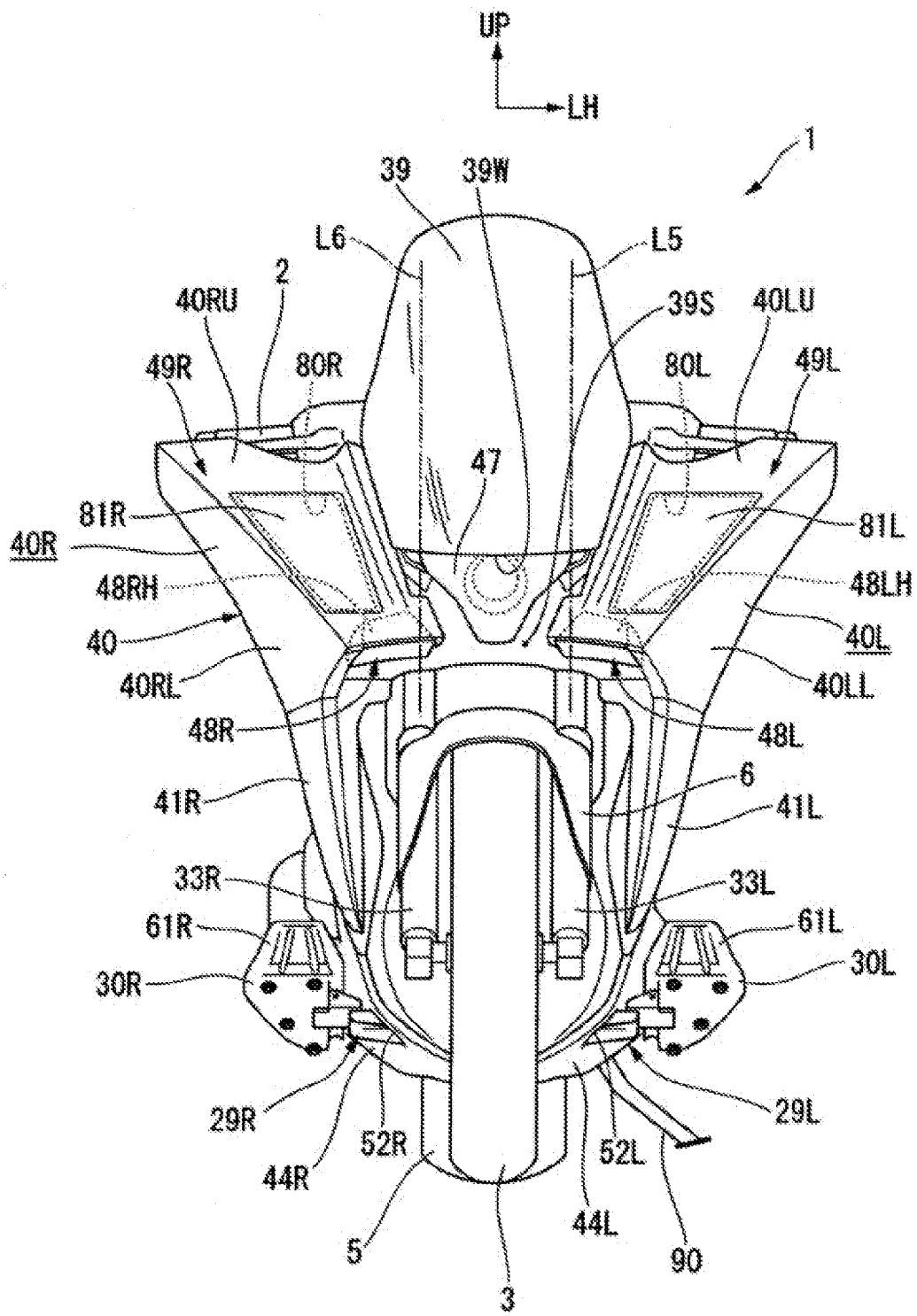
FIG. 3 is a front elevational view of the motorcycle.

Referring now to FIG. 3, outer side portions of rear portions of the left upper wall portion 40LU and the right upper wall portion 40RU in the vehicle widthwise direction overlap with left and right end portions of the handlebar 2 as viewed in front elevation. Therefore, the left and right end portions of the handlebar 2 are covered with the rear portions of the left upper wall portion 40LU and the right upper wall portion 40RU, respectively. Consequently, in the motorcycle 1, part of the front cowl 40 functions as knuckle guards. Further, referring to FIG. 4, side mirrors Mi are attached to outer side portions of the left rear wall portion 40LB and the right rear wall portion 40RB in the vehicle widthwise direction. Therefore, in the motorcycle 1, part of the front cowl 40 functions as attaching portions for the mirrors.

Figure 23:
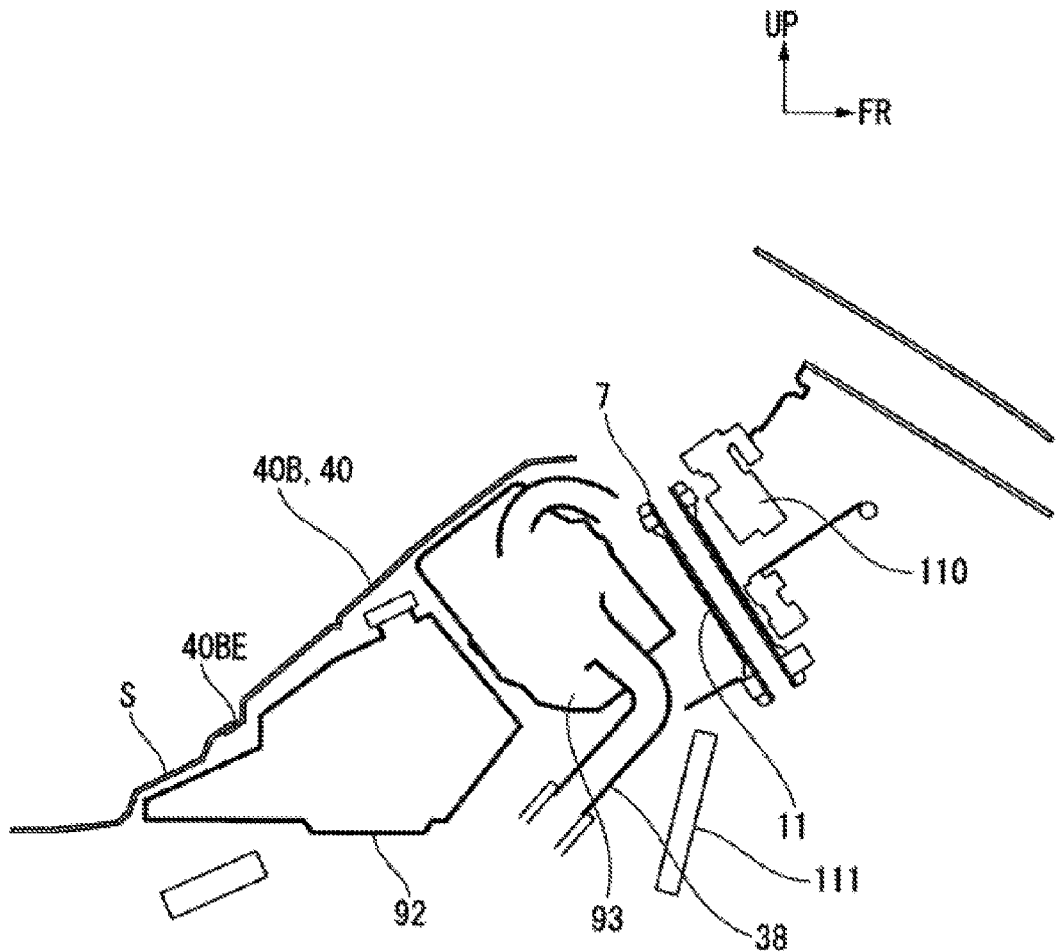
FIG. 23 is a schematic sectional view taken along line C-C of FIG. 21.

On the other hand, the rear portion 40B is connected to inner side edges in the vehicle widthwise direction of the rear wall portion 40LB and the rear wall portion 40RB of the left side portion 40L and the right side portion 40R. The inner side edges of the rear wall portion 40LB and the rear wall portion 40RB are positioned sidewardly of the head pipe 11 and extend in the upward and downward direction. The rear portion 40B is formed in a downwardly tapering shape as viewed in top plan. Referring to FIG. 23, the rear portion 40B includes a cowl extending portion 40BE which extends at a rear end thereof to a front end of a seat S on which a rider is to be seated. The seat S extends in the forward and backward direction and is supported on the seat frames 14L and 14R.

As viewed in side elevation, left and right upper edges of the rear portion 40B extend rearwardly downwardly, and left and right lower edges of the rear portion 40B are formed so as to be recessed in a triangular shape in the upward direction. The air guide covers 42L and 42R are provided so as to fill up the left and right recessed spaces of the rear portion 40B. The air guide covers 42L and 42R are formed in an elongated shape in the forward and backward direction and extend substantially horizontally. On the other hand, lower edges of the left side wall portion 40LL and the right side wall portion 40RL of the left side portion 40L and the right side portion 40R extend, on the front side thereof which forms a tapering tip end as viewed in side elevation, obliquely upwardly toward the front. Meanwhile, the lower edges of the left side wall portion 40LL and the right side wall portion 40RL extend, at locations thereof on the rear side, substantially horizontally, and the left and right front side cowls 41L and 41R extend downwardly contiguously to the substantially horizontal portions of the lower edges.

The left and right front side cowls 41L and 41R have a substantially triangular shape tapering downwardly as viewed in side elevation. Front edges of the left and right front side cowls 41L and 41R are formed so as to extend rearwardly downwardly contiguously to the front side lower edges of the left side wall portion 40LL and the right side wall portion 40RL which form the tapering tip end as viewed in side elevation.

In the motorcycle 1, a windscreen 39 is provided between the left side portion 40L and the right side portion 40R of the front cowl 40. The windscreen 39 is supported by a stay (not shown) disposed between the left side portion 40L and the right side portion 40R in front of the head pipe 11. In the present embodiment, the windscreen 39 is not secured directly to the front cowl 40 but extends obliquely upwardly rearwardly at the center in the vehicle widthwise direction in such a manner as to rise from the front cowl 40. The windscreen 39 is disposed in such a manner that it fills up a gap between the left side portion 40L and the right side portion 40R in the vehicle widthwise direction. Besides, a front end of the windscreen 39 is positioned on the rear of the front edge of the left side portion 40L and the right side portion 40R. Further, in the present motorcycle 1, a space surrounded by the front end of the windscreen 39 and portions of the left side portion 40L and the right side portion 40R which are positioned on the front side of the front edge of the windscreen 39 forms a wind inlet portion 39S. The wind inlet portion 39S takes in running wind therethrough from the front and guides the running wind to the rear of the windscreen 39. A headlamp 47 which is a headlight is disposed in the wind inlet portion 39S. The wind inlet portion 39S is formed at a middle position in the vehicle widthwise direction and is a space which takes in running wind from the front into the inside thereof and supplies the running wind to the rear of the windscreen 39. A wind entrance 39W in the form of a gap is formed between the windscreen 39 (front end portion of the windscreen 39) and the headlamp 47 (upper end portion of the headlamp 47). The wind inlet portion 39S sends running wind taken therein to the wind entrance 39W to supply the running wind to the rear of the windscreen 39. The wind entrance 39W is positioned at the middle position in the vehicle widthwise direction between the left side portion 40L and the right side portion 40R. A position lamp 48L is provided at a front end portion of the left side portion 40L, and another position lamp 48R is provided at a front end portion of the right side portion 40R. Details of the disposition configuration of the headlamp 47, position lamp 48L and position lamp 48R are hereinafter described. It is to be noted that, in the motorcycle 1, an air guide path for introducing running wind taken in the wind inlet portion 39S to a predetermined electric component may be formed to cool the electric component.

Further, in the motorcycle 1, an accommodation portion 49L is formed in the left side portion 40L, and another accommodation portion 49R is formed in the right side portion 40R. Details of the configuration of the accommodation portion 49L and the accommodation portion 49R are hereinafter described.

Referring back to FIGS. 1 and 2, the left center side cowl 43L first extends in the forward and backward direction below the left air guide cover 42L. The left center side cowl 43L further extends in such a manner as to go around to the rear side of a generator cover portion 25G of a cylindrical shape projecting from a left side face of the crankcase 25 to the outer side in the vehicle widthwise direction. Further, the left center side cowl 43L connects to the front side of a lower edge of a left side portion of the seat S. The right center side cowl 43R first extends in the forward and backward direction below the right air guide cover 42R. The right center side cowl 43R further extends to a position above a clutch cover portion 25C of a cylindrical shape which projects from a right side face of the crankcase 25 to the outer side in the vehicle widthwise direction. Further, the right center side cowl 43R connects to the front side of a lower edge of a right side portion of the seat S.

The under cowl 44L and the under cowl 44R extend in the forward and backward direction from a position very near to the rear of the front wheel 3 to a position very near to the front of the rear wheel 5. The under cowl 44L and the under cowl 44R thus principally cover a lower portion of the crankcase 25 of the engine 24 from the outer sides in the vehicle widthwise direction.

Referring now to FIGS. 1 and 6, in the motorcycle 1, the left under cowl 44L has an under cowl main body 44LM and a swelling portion 44LP formed thereon. The under cowl main body 44LM covers a lower portion of the crankcase 25 from the outer side in the vehicle widthwise direction and from below along the forward and backward direction. The swelling portion 44LP is formed along a periphery of the generator cover portion 25G of the crankcase 25, the generator cover portion 25G being formed at a higher position than the lower portion of the crankcase 25 covered by the under cowl main body 44LM and swelling to the outer side in the vehicle widthwise direction. The swelling portion 44LP has an opening 44LA formed as a cutout thereon such that it exposes the generator cover portion 25G therethrough to the outer side in the vehicle widthwise direction.

Referring now to FIGS. 2 and 6, the right under cowl 44R has an under cowl main body 44RM and a swelling portion 44RP formed thereon. The under cowl main body 44RM covers a lower portion of the crankcase 25 from the outer side in the vehicle widthwise direction and from below along the forward and backward direction. The swelling portion 44RP is formed along a periphery of the clutch cover portion 25C of the crankcase 25, the clutch cover portion 25C being formed at a higher position than the lower portion of the crankcase 25 covered by the under cowl main body 44RM and swelling to the outer side in the vehicle widthwise direction. The swelling portion 44RP has an opening 44RA formed as a cutout thereon such that it exposes the clutch cover portion 25C therethrough to the outer side in the vehicle widthwise direction.

Referring to FIG. 6, in the present embodiment, the left and right under cowls 44L and 44R are connected for disconnection only at front end portions thereof. To this end, the left and right under cowls 44L and 44R have connecting portions provided at the front end portions thereof for disconnectably connecting them to each other. Rear portions of the connecting portions are spaced from each other in the vehicle widthwise direction such that a lower portion of the crankcase 25 is partly exposed therebetween. It is to be noted that reference symbol PL in FIG. 6 denotes a parting line of the left and right under cowls 44L and 44R. The parting line PL is positioned at the center in the vehicle widthwise direction. The connecting portions of the left and right under cowls 44L and 44R are configured from a recessed portion 440 formed at a location of the left under cowl 44L along the parting line PL and a protruding portion 441 formed at a location of the right under cowl 44R along the parting line PL. The protruding portion 441 is engaged with the recessed portion 440 to integrate the left and right under cowls 44L and 44R with each other.

More particularly, in the left under cowl 44L, the swelling portion 44LP is swollen upwardly from a substantially central portion of the left under cowl main body 44LM in the forward and backward direction. The swelling portion 44LP is formed in a substantially arcuate shape, and the opening 44LA formed in the swelling portion 44LP has a circular shape. It is to be noted that a cover member 50 is formed integrally on an inner edge of a lower portion of the circular opening 44LA and covers a lower portion of the generator cover portion 25G.

An upper portion of the swelling portion 44LP is spaced from the seat S. The left center side cowl 43L extends through a gap between the swelling portion 44LP and the seat S spaced from each other in the upward and downward direction and further extends in such a manner as to go around to the rear of the generator cover portion 25G. Further, the left center side cowl 43L connects to the front side of a lower edge of a left side portion of the seat S. A rear portion of the center side cowl 43L is spaced in the upward and downward direction from a portion of the under cowl main body 44LM on the rear of the swelling portion 44LP. The center side cowl 43L abuts in the upward and downward direction with and connects to a forward portion of the under cowl main body 44LM with respect to the swelling portion 44LP. An abutting recessed portion 51 is formed in an upwardly recessed state on the center side cowl 43L. The center side cowl 43L abuts in the forward and backward direction with and connects principally to a front portion of the swelling portion 44LP at the abutting recessed portion 51.

A front portion of the left rear side cowl 45L is positioned in a gap in the upward and downward direction between a rear portion of the center side cowl 43L and a portion of the under cowl main body 44LM on the rear of the swelling portion 44LP. The rear side cowl 45L abuts at a front end portion thereof with a rear portion of the swelling portion 44LP and extends rearwardly.

On the other hand, on the right under cowl 44R, the swelling portion 44RP swells upwardly from a substantially central portion of the under cowl main body 44RM in the forward and backward direction. The swelling portion 44RP is formed in such a shape that it is elongated in the forward and backward direction and is inclined rearwardly upwardly. The opening 44RA formed in the swelling portion 44RP is formed in an elongated state in the forward and backward direction such that it exposes the clutch cover portion 25C and a peripheral region of the clutch cover portion 25C therethrough.

An upper portion of the swelling portion 44RP extends and connects to the seat S. The right center side cowl 43R extends to a location at which the seat S and the upper portion of the swelling portion 44RP connect to each other and connects to the front side of a lower edge of a left side portion of the seat S. The center side cowl 43R abuts in the forward and backward direction with and connects to the swelling portion 44RP.

The right rear side cowl 45R abuts at a front end portion thereof with a rear portion of the swelling portion 44RP and extends rearwardly. Rear portions of the rear side cowls 45L and 45R extend to a location above the rear wheel 5. The rear cowl 46 is attached to and extends in the vehicle widthwise direction between rear portions of the rear side cowls 45L and 45R above the rear wheel 5. The rear cowl 46 connects to a rear end of the seat S and extends rearwardly.

Here, assembly of the under cowls 44L and 44R, center side cowls 43L and 43R and rear side cowls 45L and 45R is described briefly. The opening 44LA of the under cowl 44L is fitted with the generator cover portion 25G and the opening 44RA of the right under cowl 44R is fitted with the clutch cover portion 25C. The under cowls 44L and 44R are thereby positioned in the forward and backward direction and the upward and downward direction by and an attached to the generator cover portion 25G and the clutch cover portion 25C, respectively. The center side cowl 43L and the rear side cowl 45L are positioned in the forward and backward direction and the upward and downward direction by the swelling portion 44LP of the under cowl 44L and are assembled to the vehicle body side. Further, the center side cowl 43R and the rear side cowl 45R are positioned in the forward and backward direction and the upward and downward direction by the swelling portion 44RP of the under cowl 44R and assembled to the vehicle body side.

The left step 30L is disposed on the outer side of a front portion of the under cowl main body 44LM in the vehicle widthwise direction. The right step 30R is disposed on the outer side of a front portion of the under cowl main body 44RM in the vehicle widthwise direction. A sub frame opening 52L through which the sub frame 29L is to be fitted is formed at a front portion of the under cowl main body 44LM. Another sub frame opening 52R through which the sub frame 29R is to be fitted is formed at a front portion of the under cowl main body 44RM.

A cutout 53L of a rectangular shape elongated in the forward and backward direction is formed on an upper edge of a rear portion of the under cowl main body 44LM. A left pillion step 54L for a passenger is disposed near an edge portion of the cutout 53L on the inner side of the cutout 53L. Meanwhile, a cutout 53R of a rectangular shape elongated in the forward and backward direction is formed on an upper edge of a rear portion of the under cowl main body 44RM. A right pillion step 54R for a passenger is disposed near an edge portion of the cutout 53R on the inner side of the cutout 53R. The left and right pillion steps 54L and 54R are configured for changeover between a use position (S1) and a retracted position (S2). At the use position (S1), the left and right pillion steps 54L and 54R project to the outer sides in the vehicle widthwise direction and allow the passenger to place the feet thereon. At the retracted position (S2), the left and right pillion steps 54L and 54R are positioned on the inner side in the vehicle widthwise direction from those at the use position.

Now, the sub frames 29L and 29R for supporting the left and right steps 30L and 30R are described in detail with reference to FIGS. 7 and 10 to 13. The left sub frame 29L has a pair of extending portions 55L and a connecting portion 56L and is formed in a substantially channel shape as viewed in side elevation. The extending portions 55L are fastened to two upper and lower places on the engine hanger 17L and extend obliquely forwardly downwardly substantially in parallel to each other from the fastened portions thereof. The connecting portion 56L connects front ends of the extending portions 55L to each other. A stay portion 57L is provided on the connecting portion 56L such that it extends in an elongated state in the extension direction of the connecting portion 56L as viewed in side elevation and extends widely to the outer side in the vehicle widthwise direction. The left step 30L is provided on the stay portion 57L. It is to be noted that also the right sub frame 29R includes extending portions 55R, a connecting portion 56R and a stay portion 57R similar to those described above. The right step 30R is provided on the stay portion 57R.

In the present embodiment, a first one of the paired extending portions 55L of the left sub frame 29L which extends from the upper side of the engine hanger 17L extends from a position a little lower than a central region of the engine hanger 17L in the upward and downward direction. Meanwhile, the other one of the paired extending portions 55L extends from a lower end portion of the engine hanger 17L. The extending portion 55L extending from the upper side of the engine hanger 17L is formed a little longer than the extending portion 55L which extends from the lower side. The connecting portion 56L which connects the front ends of the upper and lower extending portions 55L extends moderately obliquely upwardly toward the front. It is to be noted that also the paired extending portions 55R of the right sub frame 29R are configured similarly to those of the left sub frame 29L. Further, in the present embodiment, the extending portion 55L extending from the lower side of the engine hanger 17L and the connecting portion 56L are formed as an integral member from a single pipe member, and the extending portion 55R extending from the lower side of the engine hanger 17R and the connecting portion 56R are formed as an integral member from a single pipe member. However, the paired extending portions 55L and the connecting portion 56L may be formed as an integral member from a single pipe member, and the paired extending portions 55R and the connecting portion 56R may be formed as an integral member from a single pipe member.

Figure 12:
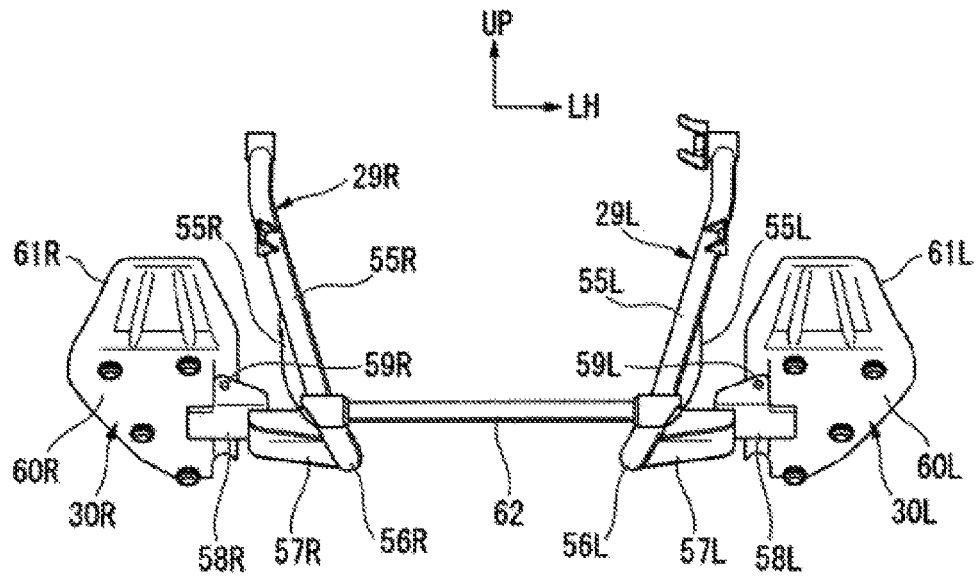
FIG. 12 is a front elevational view of the steps.
Figure 13:
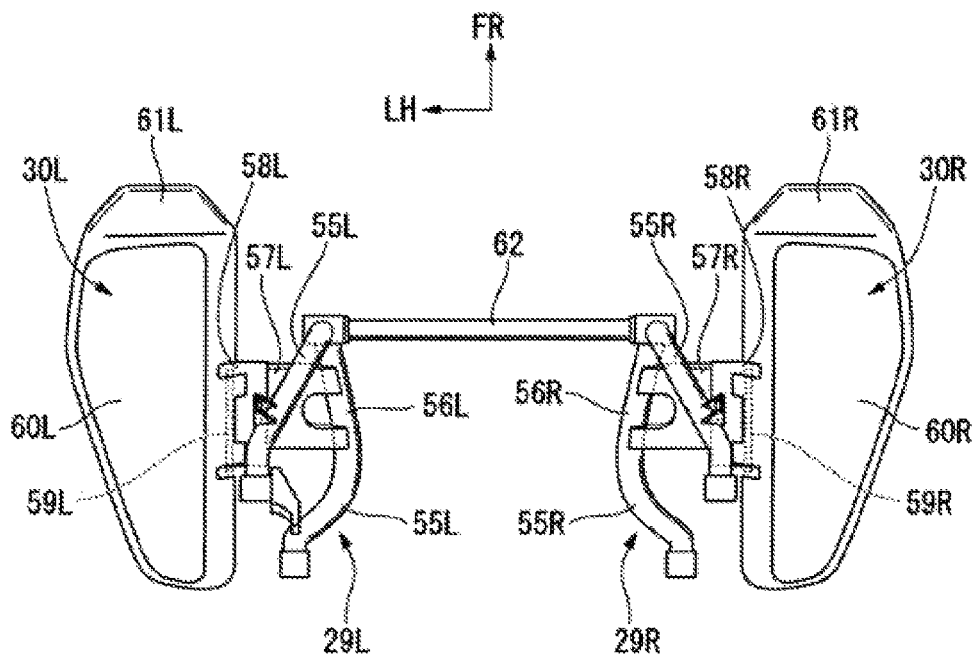
FIG. 13 is a top plan view of the steps.

The left and right stay portions 57L and 57R are each formed as a plate. As shown in FIGS. 12 and 13, the stay portion 57L supports the left step 30L for pivotal motion thereon through a bracket 58L in the form of a plate secured to the outer side in the vehicle widthwise direction. The stay portion 57R supports the right step 30R for pivotal motion thereon through a bracket 58R in the form of a plate secured to the outer side in the vehicle widthwise direction. A pivot shaft 59L is provided on the bracket 58L and extends along a direction in which the connecting portion 56L extends as viewed in side elevation. The left step 30L is connected for pivotal motion to the bracket 58L through the pivot shaft 59L thereby to be connected for pivotal motion to the stay portion 57L. It is to be noted that a pivot shaft 59R is provided on the right bracket 58R, and the right step 30R is connected for pivotal motion to the stay portion 57R in a similar manner as described above.

Referring to FIGS. 1, 2 and 6, the sub frame opening 52L formed at a front portion of the under cowl main body 44LM allows the stay portion 57L to extend therethrough. Meanwhile, the sub frame opening 52R formed at a front portion of the under cowl main body 44RM allows the stay portion 57R to extend therethrough.

The left step 30L has a foot receiving portion 60L extending in an elongated state along the connecting portion 56L and stay portion 57L. The left step 30L further has a foot rest portion 61L extending obliquely forwardly upwardly at a different angle from a front end of the foot receiving portion 60L. The left step 30L is movable around the pivot shaft 59L between a retracted position at which the foot receiving potion 60L extends in the upward and downward direction and a use position at which the foot receiving portion 60L protrudes to the outer side in the vehicle widthwise direction. Also the right step 30R has a foot receiving portion 60R and a foot rest portion 61R similar to those described hereinabove.

Referring to FIGS. 1 and 2, as viewed in side elevation, the left and right foot rest portions 61L and 61R are formed so as to connect to front edge portions 41LF and 41RF extending rearwardly downwardly from the front to the rear of the front side cowls 41L and 41R disposed at a front portion of the vehicle.

Referring to FIGS. 10 to 13, in the present embodiment, the left and right sub frames 29L and 29R are connected at front portions thereof to each other and integrated by a left-right connecting portion 62. More particularly, the left-right connecting portion 62 extends between the connecting portion of the upper side one of the paired extending portions 55L to the connecting portion 56L and the connecting portion of the upper side one of the paired extending portions 55R to the connecting portion 56R. The left-right connecting portion 62 is formed from a pipe member. Referring to FIG. 12, the left and right sub frames 29L and 29R are formed so as to extend toward the inner side in the vehicle widthwise direction toward the lower side as viewed in front elevation.

Figure 14:
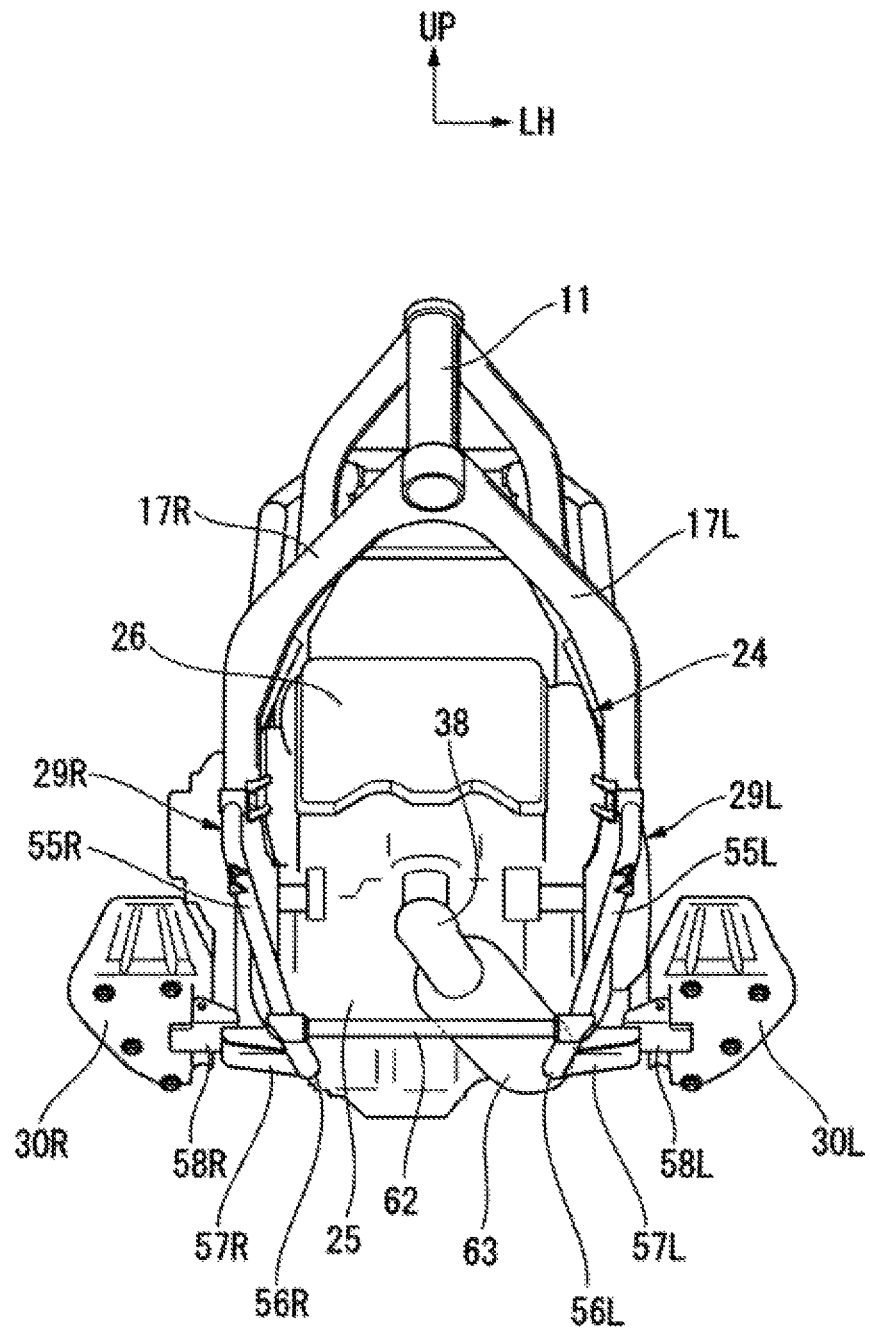
FIG. 14 is a view showing the vehicle body frame, the sub frames and a catalytic converter, which is provided on an exhaust pipe extending from an engine, as viewed in a front elevation of the vehicle.
Figure 15:
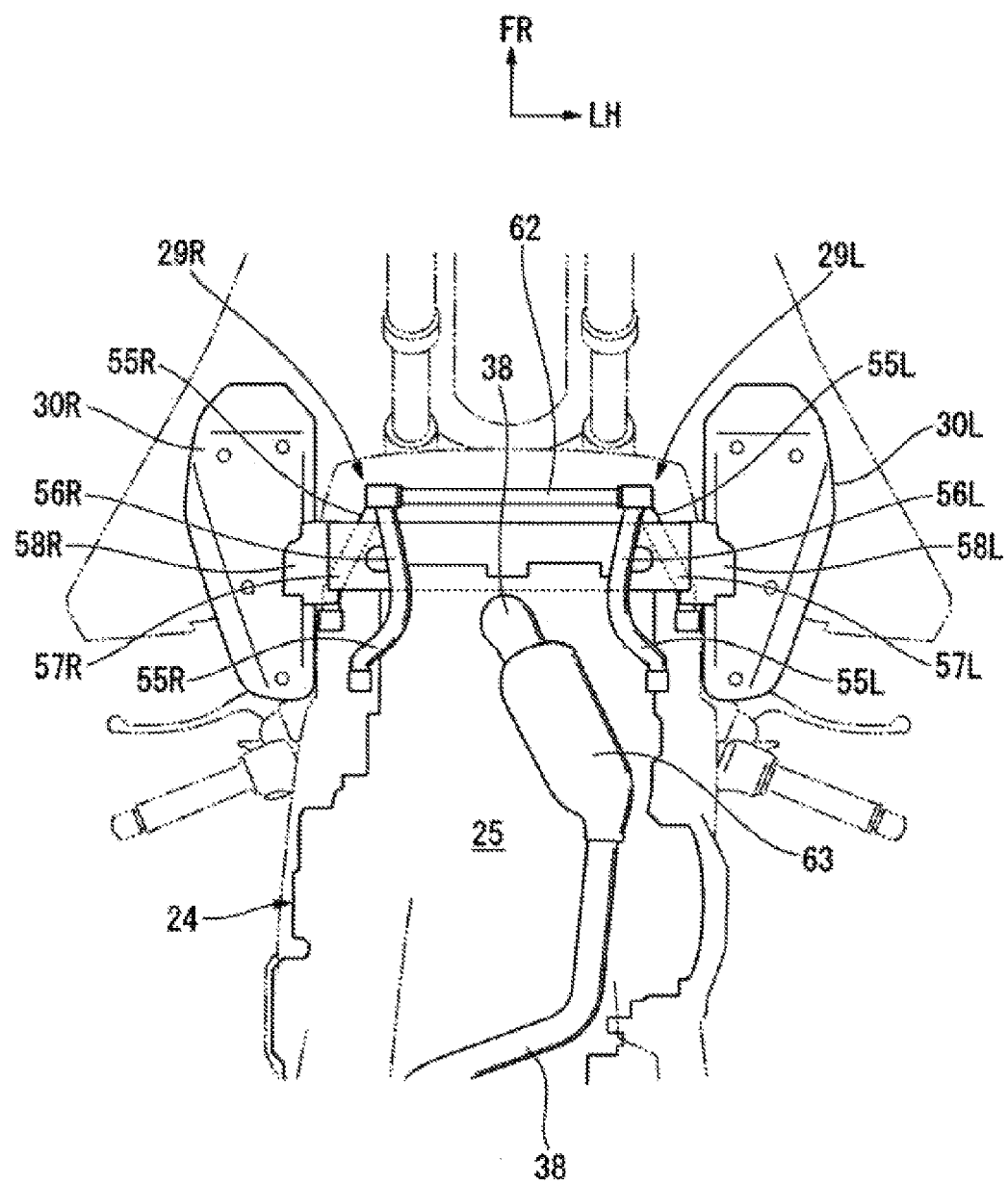
FIG. 15 is a view showing the vehicle body frame, the sub frames and the catalytic converter as viewed in a bottom plan of the vehicle.

FIGS. 14 and 15 show a catalytic converter 63 provided intermediately of the exhaust pipe 38. The catalytic converter 63 is disposed on the upstream side of the exhaust pipe 38 below the crankcase 25. As shown in FIGS. 14 and 15, the exhaust pipe 38 is disposed such that the upstream side thereof is positioned in a space on the inner side of the left and right sub frames 29L and 29R in the vehicle widthwise direction and behind the left-right connecting portion 62. Also the catalytic converter 63 is disposed in the proximity of the crankcase 25 just below the crankcase 25 such that part of the catalytic converter 63 is positioned in a space on the inner side of the left and right sub frames 29L and 29R in the vehicle widthwise direction and behind the left-right connecting portion 62. It is to be noted that, referring to FIG. 6, the right under cowl 44R covers part of the catalytic converter 63 from below. Further, in FIG. 2, a foot brake BR provided on the right step 30R is indicated by an alternate long and two short dashes line. The foot brake BR is preferably provided for rocking motion on the foot rest portion 61R of the right step 30R. The foot brake BR is stepped down upon by the rider to apply braking force to the rear wheel 5. Preferably, the foot brake BR is provided on the foot rest portion 61R, and in this instance, the operability is favorable and the comfort of the ride can be maintained.

Figure 16:
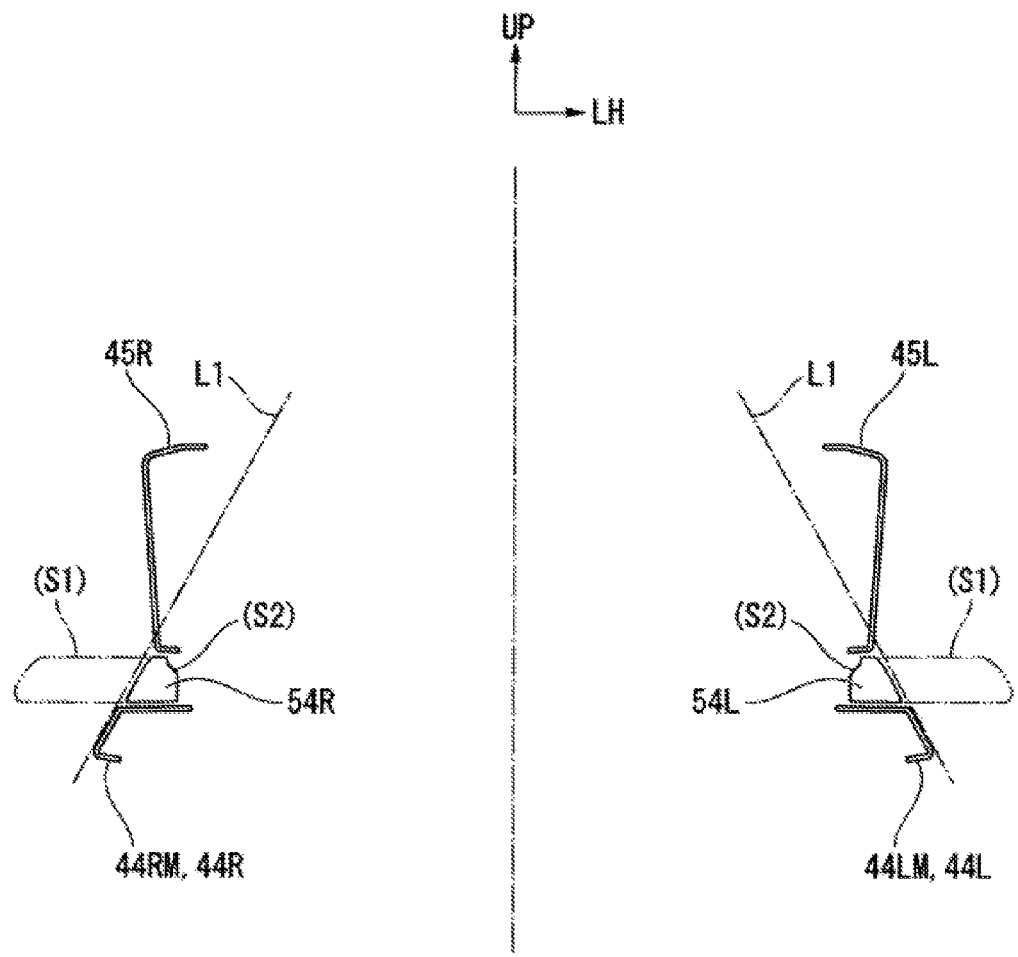
FIG. 16 is a schematic sectional view taken along line A-A of FIG. 1.

FIG. 16 shows a schematic sectional view taken along line A-A of FIG. 1 and particularly shows a vertical sectional view of the rear side cowls 45L and 45R, under cowls 44L and 44R and left and right pillion steps 54L and 54R. FIG. 16 shows the left and right pillion steps 54L and 54R in a state in which they are positioned in the retracted position. However, in the present motorcycle 1, the left and right pillion steps 54L and 54R are configured such that, when they are at the retracted position, they are positioned on the inner side in the vehicle widthwise direction than the outer side wall portions of the under cowls 44L and 44R in the vehicle widthwise direction, respectively. Besides, the left and right pillion steps 54L and 54R in the present embodiment are formed in such a shape that, in a vertical section thereof at the retracted position, the outer side portions thereof in the vehicle widthwise direction extend downwardly while they extend in an inclined relationship from the upper side to the outer sides in the vehicle widthwise direction. At the retracted position, the outer side portions of the left and right pillion steps 54L and 54R in the vehicle widthwise direction connect linearly (refer to a straight line L1 in FIG. 16) to the outer side wall portions of the corresponding under cowls 44L and 44R in the vehicle widthwise direction, respectively. It is to be noted that, in FIG. 16, the left and right pillion steps 54L and 54R placed in the use position (S1) are indicated by alternate long and two short dashes lines.

Referring to FIGS. 1, 2, 4 and 5, the left step 30L and the right step 30R are provided to receive the feet of the rider, who is seated on the seat S, placed thereon. In the motorcycle 1, the seat S includes a seating portion 65 on which the rider is to be seated, and a seat backrest portion 66 having an upwardly erected state behind the seating portion 65. The seat backrest portion 66 is configured for rearwardly reclining movement. When the seat backrest portion 66 is reclined by a maximum amount to the rear, it serves as a passenger's seat on which a passenger is to be seated. The left and right pillion steps 54L and 54R are used to receive the feet of the passenger, who is seated on the seat backrest portion 66, placed thereon. It is to be noted that, in FIGS. 1 to 6, the seat backrest portion 66 is shown in a state in which it is reclined to the rear. In FIG. 4, the seat backrest portion 66 is indicated in an erected state by an alternate long and two short dashes line.

Figure 17:
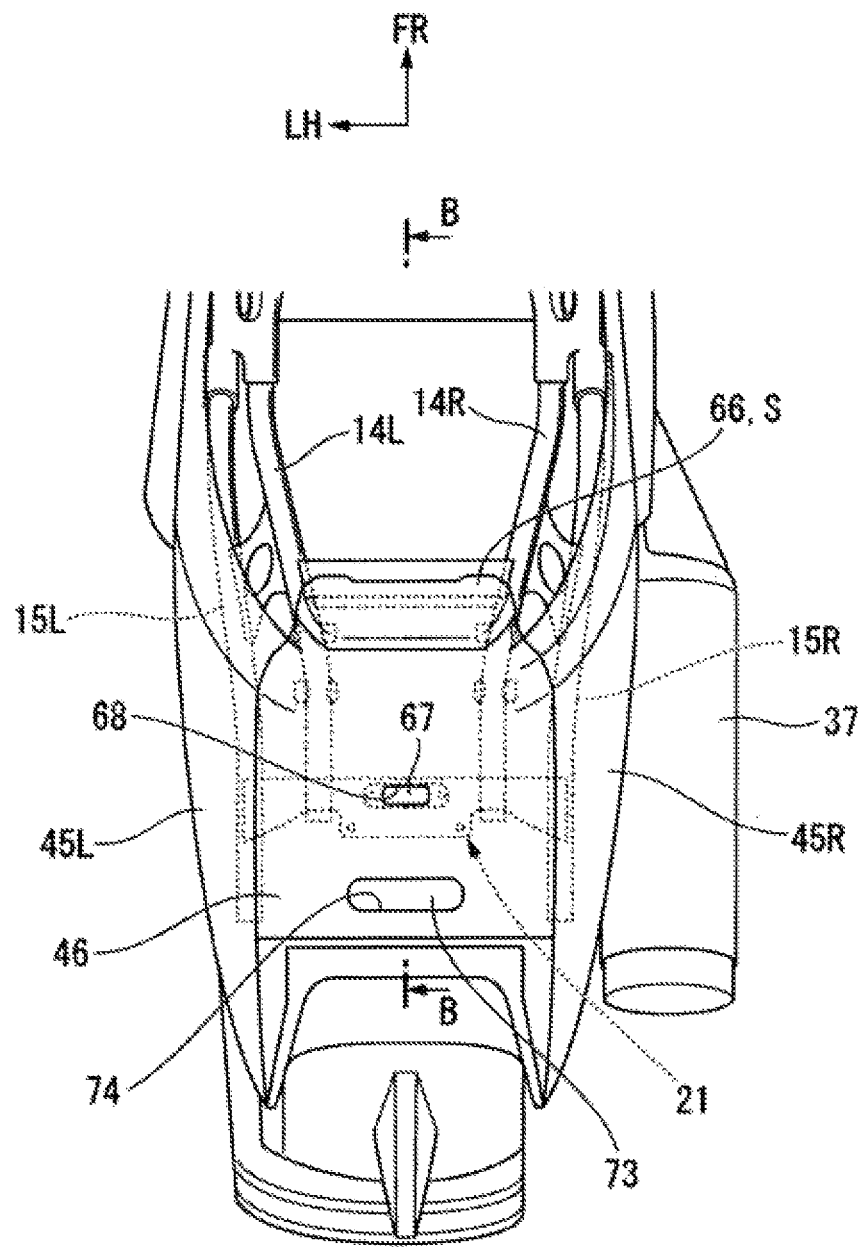
FIG. 17 is a top plan view of a rear portion of the vehicle body of the motorcycle in a state in which a seating portion of a seat is removed.
Figure 18:
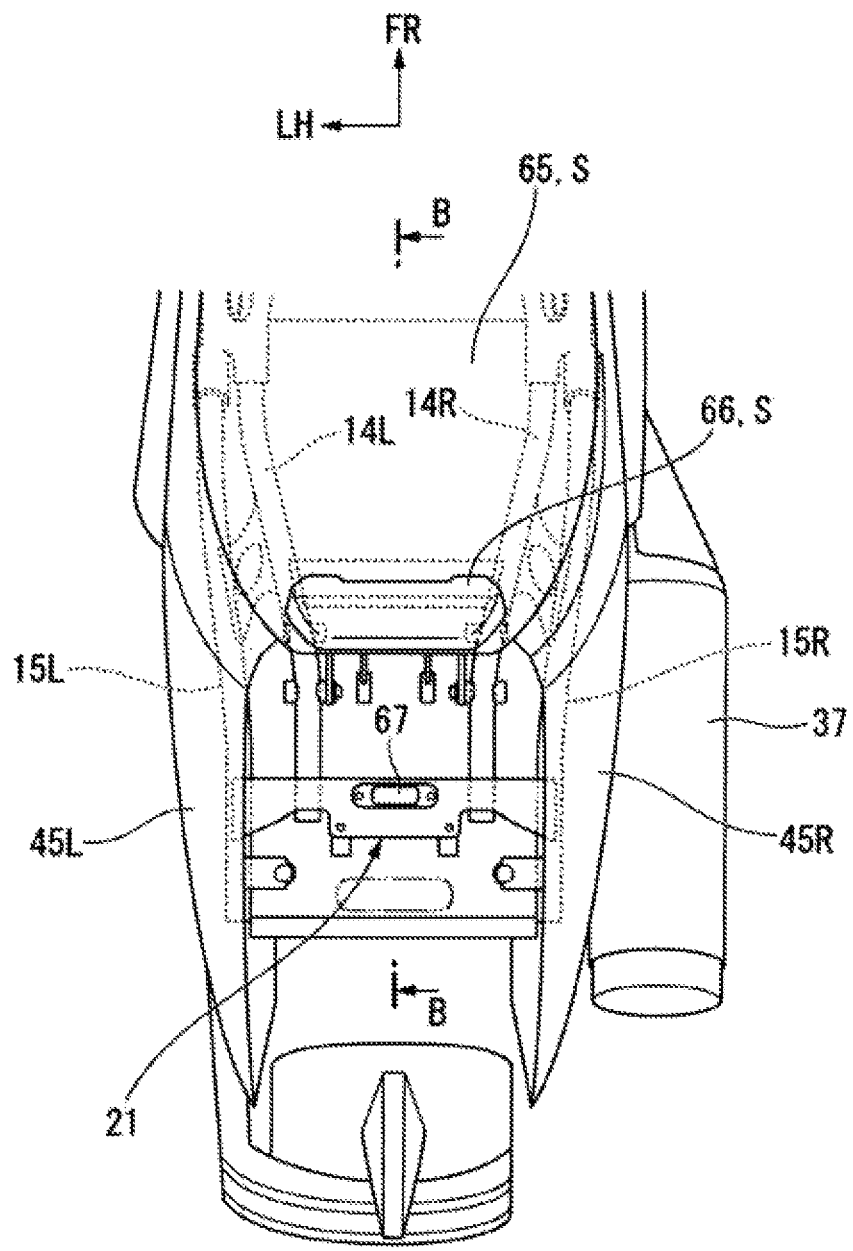
FIG. 18 is a top plan view of the rear portion of the vehicle body of the motorcycle in a state in which a rear cowl is removed.

Referring to FIGS. 17 and 18, at a rear portion of the vehicle body around the seat S, the rear cowl 46 is disposed behind the seating portion 65 and the seat backrest portion 66 which is in an erected state. The left and right seat frames 14L and 14R extend below the rear cowl 46, and the seat cross frame 21 which connects the left and right seat frames 14L and 14R to each other is positioned below the rear cowl 46. It is to be noted that, in FIGS. 17 and 18, the seat backrest portion 66 is in an erected state.

Figure 19:
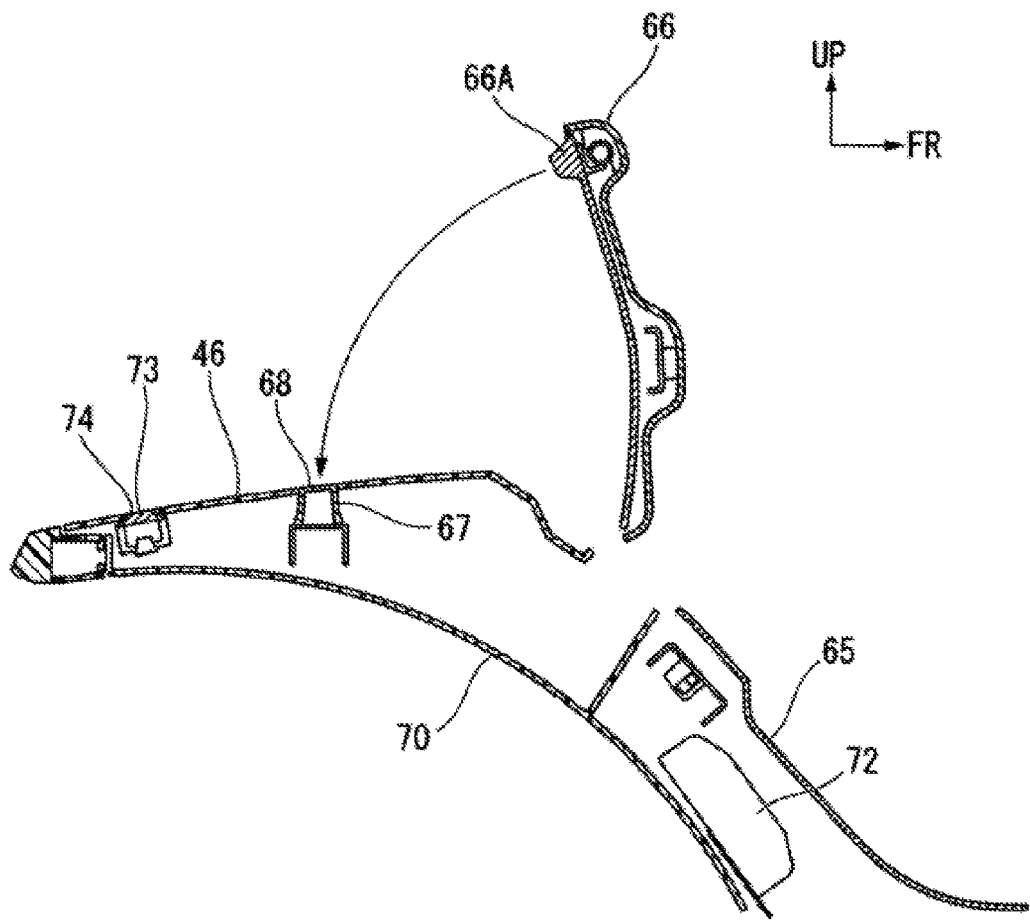
FIG. 19 is a schematic sectional view taken along line B-B of FIGS. 17 and 18.

A receiving portion 67 is provided on the seat cross frame 21 such that it projects upwardly, and a receiving portion opening 68 is formed in the rear cowl 46 such that the receiving portion 67 is exposed upwardly therethrough. FIG. 19 shows a schematic sectional view taken along line B-B of FIGS. 17 and 18. Referring to FIG. 19, when the seat backrest portion 66 is reclined by a maximum amount to the rear, it is abutted with and supported from below by the receiving portion 67. It is to be noted that, in the present embodiment, the height of the receiving portion 67 is set such that a peripheral edge portion of the receiving portion opening 68 on the upper face of the rear cowl 46 and the upper face of the receiving portion 67 connect to each other. Further, an abutting portion 66A is provided on the rear face of the seat backrest portion 66 such that it is swollen higher than a surrounding face in order to be abutted with the receiving portion 67. Preferably, the abutting portion 66A is formed from a soft material. Further, in FIG. 19, only a bottom plate of the seat backrest portion 66 is shown and only a bottom plate of the seating portion 65 is shown for the convenience of illustration.

Figure 20:
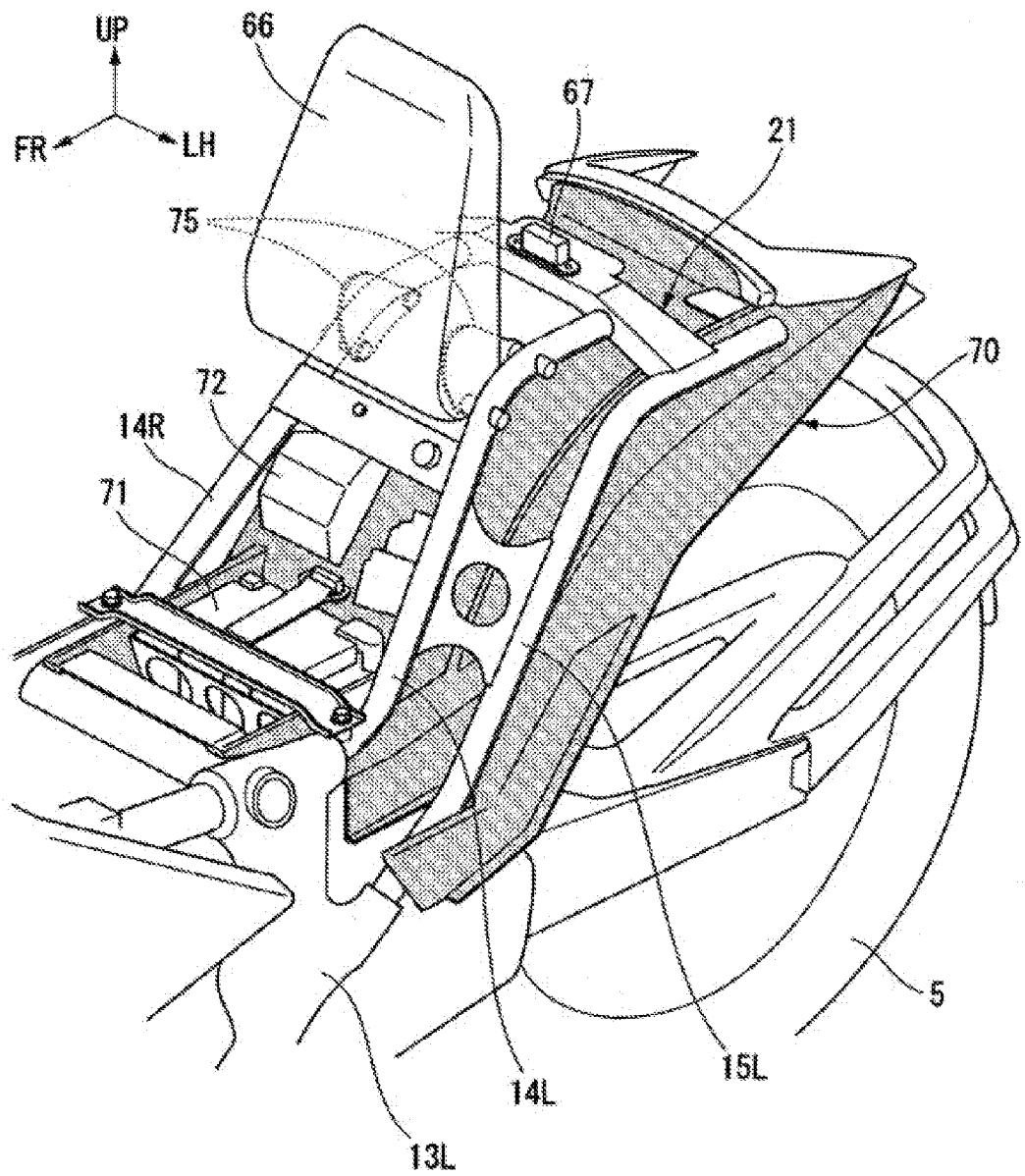
FIG. 20 is a perspective view of the rear portion of the vehicle body of the motorcycle in a state in which the seat and the rear cowl are removed.

Referring to FIG. 20, a perspective view of a rear portion of the vehicle body in a state in which the seat S, rear cowl 46 and so forth are removed is shown. In FIG. 20, a rear fender 70 provided below the rear cowl 46 is shown. It is to be noted that the rear fender 70 is shown with dots applied thereto for the convenience of illustration. The rear fender 70 extends from below the seating portion 65 of the seat S to a location above an upper end of the rear wheel 5 along the outer circumference of the rear wheel 5 and covers the rear wheel 5. In the present embodiment, electric components are attached to a location of the rear fender 70 positioned below the seating portion 65. In particular, a battery 71, a regulator 72 and so forth are provided on the rear fender 70 on the inner side of the left and right seat frames 14L and 14R in the vehicle widthwise direction.

FIG. 20 shows a pair of left and right brackets 75 for supporting the seat backrest portion 66. The left and right brackets 75 are fixed at two fixing points juxtaposed forwardly and rearwardly at a front portion of a location of the left and right seat frames 14L and 14R which extend substantially horizontally. The left and right brackets 75 project obliquely forwardly upwardly and support the seat backrest portion 66 for pivotal motion by a shaft member (not shown) at end portions thereof. It is to be noted that the brackets 75 have a restriction member (not shown) for restricting pivotal motion of the seat backrest portion 66 so as not to pivot forwardly farther than a position at which the seat backrest portion 66 exhibits the erected state.

Referring to FIGS. 17 and 19, an emblem opening 74 is formed at a portion of the rear cowl 46 on the rear side of the receiving portion opening 68. The emblem opening 74 allows an emblem 73, which is a design member separate from the rear fender 70, to be exposed to the outside therethrough from the inside of the rear cowl 46. The emblem 73 is removably attached to an inner side peripheral edge portion of the emblem opening 74 by a fastening member. It is to be noted that, while, in the present embodiment, a brand name of a manufacturer is indicated on the emblem 73, illustration and description of this are omitted. Naturally, characters and so forth indicated on the emblem 73 are not limited to those of a brand name but may be any characters or the like. It is to be noted that the emblem 73 may not function as an emblem without indicating any character or the like thereon but may be formed merely as a member of a color different from that of the rear cowl 46 or the like. However, also in this case, some variation in appearance can be provided.

Incidentally, referring back to the description of the front portion of the vehicle, in the motorcycle 1, the accommodation portion 49L is formed in the left side portion 40L and the accommodation portion 49R is formed in the right side portion 40R. In the following, the accommodation portions 49L and 49R are described in detail.

Figure 21:
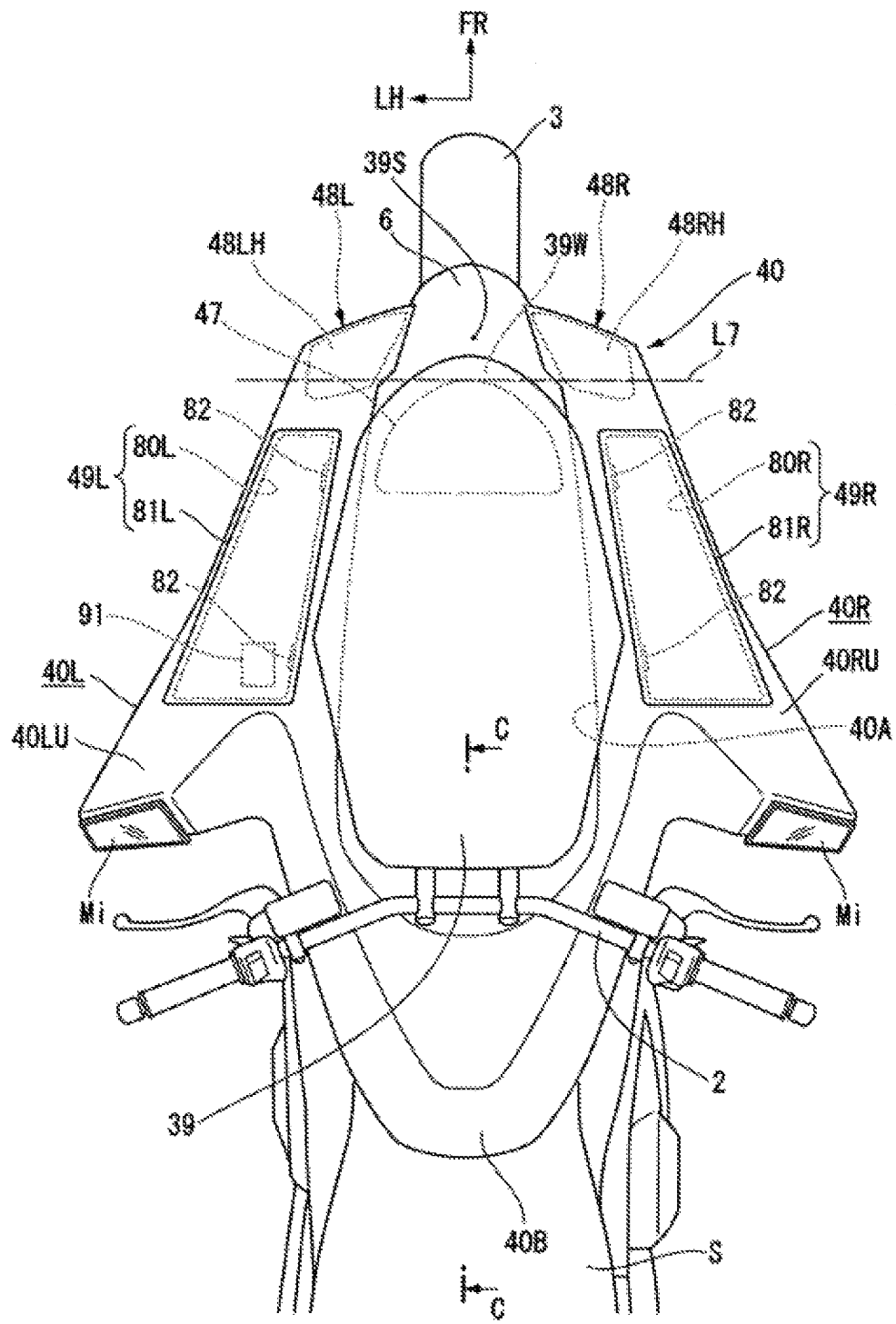
FIG. 21 is a top plan view of a front portion of the vehicle body of the motorcycle.
Figure 22:
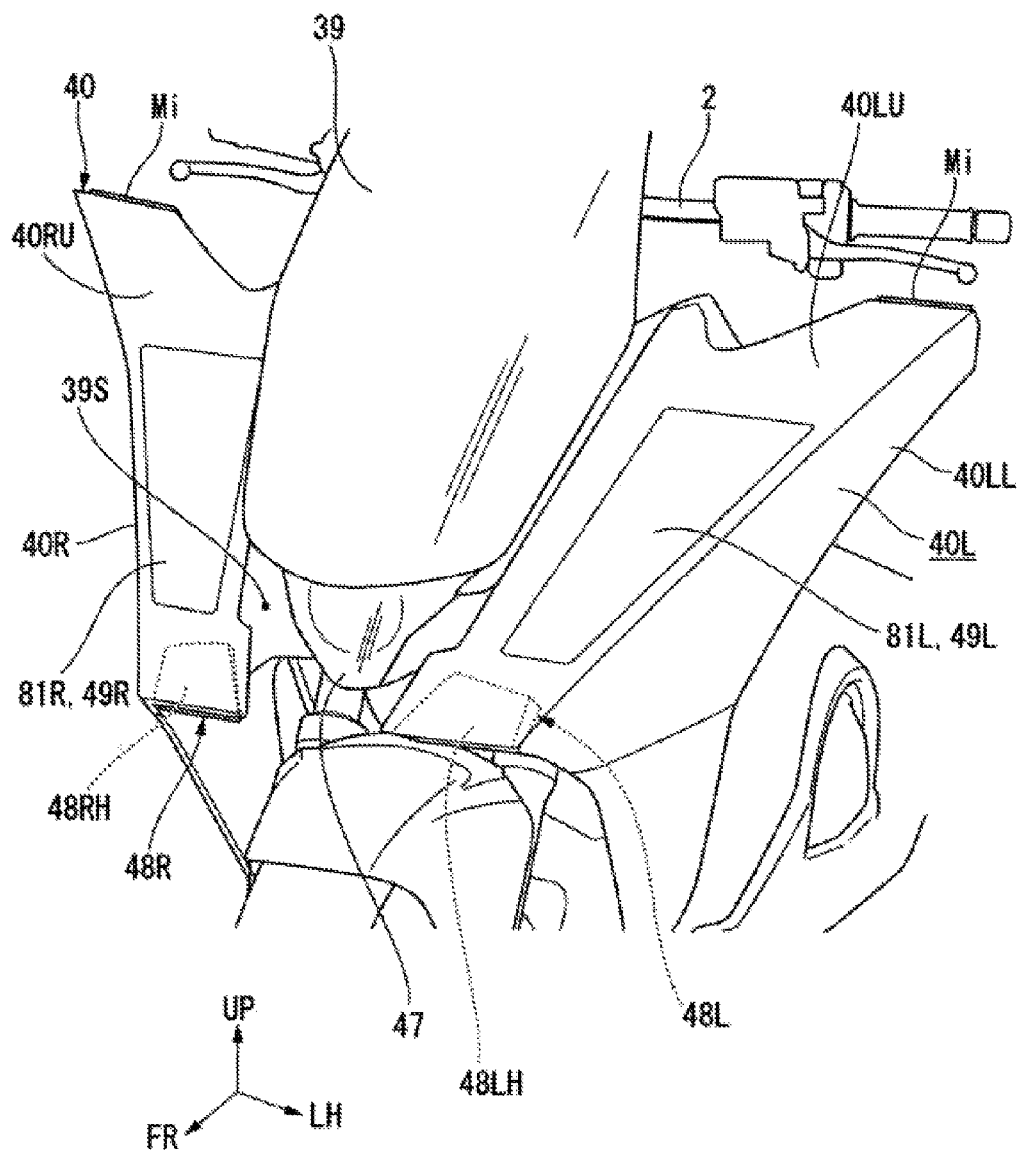
FIG. 22 is a perspective view of the front portion of the vehicle body of the motorcycle.

Referring to FIGS. 21 and 22, in the present embodiment, the left and right accommodation portions 49L and 49R are configured from left and right recessed portions 80L and 80R and left and right lids 81L and 81R, respectively. The left and right recessed portions 80L and 80R are formed in the front cowl 40 and recessed downwardly to form accommodation spaces. The left and right lids 81L and 81R cover the recessed portions 80L and 80R from above such that they can open or close the recessed portions 80L and 80R, respectively.

In the present embodiment, the recessed portions 80L and 80R are formed in a substantially rectangular shape elongated in the forward and backward direction. Also the left and right lids 81L and 81R are formed each as a plate of a substantially rectangular shape elongated in the forward and backward direction and abut with peripheral edges of the recessed portions 80L and 80R to cover the recessed portions 80L and 80R, respectively.

The left and right lids 81L and 81R are mounted for opening and closing movement by hinges 82 provided on inner walls positioned on the inner side of the recessed portions 80L and 80R in the vehicle widthwise direction, respectively. The recessed portions 80L and 80R are opened by erecting the lids 81L and 81R upwardly from the outer sides in the vehicle widthwise direction. In this case, upon an accommodation operation, the lids 81L and 81R do not make an obstacle to the operation, and this provides superior convenience in use. Further, the lids 81L and 81R include adjustment mechanisms for keeping the same in a predetermined pivotal position or posture upon opening thereof.

More particularly, it is described above that, as viewed in top plan, the left upper wall portion 40LU of the left side portion 40L and the right upper wall portion 40RU of the right side portion 40R are formed so as to be extended to the outer sides in the vehicle widthwise direction toward the rear. Also it is described above that the left upper wall portion 40LU and the right upper wall portion 40RU are formed so as to be extended by a greater amount to the outer sides in the vehicle widthwise direction toward the rear at the outer side edges in the vehicle widthwise direction than at the inner side edges in the vehicle widthwise direction thereof. Further, it is described above that the left upper wall portion 40LU and the right upper wall portion 40RU are formed such that the dimensions in the vehicle widthwise direction of the inner side edges and the outer side edges in the vehicle widthwise direction thereof increase toward the rear. Further, in the present embodiment, also the left and right accommodation portions 49L and 49R are formed such that the dimension thereof in the vehicle widthwise direction increases toward the rear as viewed in top plan.

Referring to FIGS. 1, 2 and so forth, in the motorcycle 1, a side stand 90 is provided, for example, on the left side of a lower portion of the vehicle body in the vehicle widthwise direction. When the motorcycle 1 is to be kept in an uprightly erected position by the side stand 90, the motorcycle 1 exhibits a leftwardly inclined state. In the left accommodation portion 49L, an electric component 91 is disposed as an article which is any other than those articles suitably accommodated by the rider or the like. In the present embodiment, the electric component 91 is a relay.

It is to be noted that FIG. 23 shows a cross section taken along line C-C of FIG. 21. The rear portion 40B of the front cowl 40 covers a fuel tank 92 and an air cleaner 93 disposed above the engine 24. It is to be noted that only a bottom plate of the seat S is shown in FIG. 23 for the convenience of illustration. Further, in FIG. 23, reference symbol 110 denotes a key cylinder disposed in front of the head pipe 11, and reference symbol 111 denotes a radiator disposed in front of the exhaust pipe 38.

Now, disposition of the headlamp 47 and the position lamps 48L and 48R is described with reference to FIGS. 1 to 3, 21 and 22. The headlamp 47 is provided at the center in the vehicle widthwise direction for illuminating the front of the vehicle. The position lamps 48L and 48R emit light to assure the visibility from a person or the like around the vehicle. It is to be noted that the left and right position lamps 48L and 48R in the present embodiment serve also as direction indicators blinkers. In particular, the left and right position lamps 48L and 48R can emit light in response to an operation of a switch for direction indication provided at a suitable location of the vehicle such that the lighting thereof is changed over from lighting as a position light to lighting for direction indication. It is to be noted that, while the position lamps 48L and 48R in the present embodiment serve also as blinkers, they may not have a function as such blinkers.

Referring to FIGS. 1 and 2, in the motorcycle 1 of the present embodiment, the left and right position lamps 48L and 48R are disposed in front of the headlamp 47. More particularly, irradiation faces of the left and right position lamps 48L and 48R which are directed forwardly (lens portions exposed to the outer side) are disposed on the front side with respect to an irradiation face of the headlamp 47 which is directed forwardly (a lens portion exposed to the outer side). More particularly, reference symbol L3 in FIGS. 1 and 2 indicates a straight line extending in the vertical direction passing the front ends of the left and right position lamps 48L and 48R. Meanwhile, L4 indicates a straight line extending in the vertical direction passing the front end of the headlamp 47. As can be apparently seen from the straight lines L3 and L4, the front ends of the left and right position lamps 48L and 48R are positioned on the front side with respect to the front end of the headlamp 47. Further, as can be recognized clearly from the straight line L4, the headlamp 47 and the left and right position lamps 48L and 48R overlap with each other in the upward and downward direction as viewed in side elevation. In other words, rear ends of the left and right position lamps 48L and 48R extend rearwardly farther than the front end of the headlamp 47. It is to be noted that, particularly as viewed in side elevation, housings 48LH and 48RH of the left and right position lamps 48L and 48R hereinafter described which are not exposed to the outside overlap with the headlamp 47 in the upward and downward direction.

As viewed in front elevation, the left and right position lamps 48L and 48R are disposed such that they sandwich the headlamp 47 therebetween and at least partly overlap with at least part of the headlamp 47 in the upward and downward direction. In particular, the housings 48LH and 48RH, which are not exposed to the outside, of the left and right position lamps 48L and 48R indicated by broken lines in FIGS. 3, 21 and 22 overlap in the upward and downward direction with a lower portion of the headlamp 47 as viewed in front elevation. It is to be noted that reference symbol L5 denotes a straight line extending in the vertical direction past a left end portion of the headlamp 47. Meanwhile, reference symbol L6 denotes a straight line extending in the vertical direction past a right end portion of the headlamp 47. That the left and right position lamps 48L and 48R overlap in the upward and downward direction with the headlamp 47 as viewed in front elevation signifies that the left and right end portions of the headlamp 47 extend to the outer sides in the vehicle widthwise direction farther than the inner side end portions in the vehicle widthwise direction of the left and right position lamps 48L and 48R as viewed in front elevation.

Referring further to FIGS. 5 and 21, also as viewed in top plan, the left and right position lamps 48L and 48R are disposed so as to sandwich the headlamp 47 therebetween. Referring to FIG. 21, reference symbol L7 denotes a straight line extending in the vehicle widthwise direction passing a front end of the headlamp 47. As viewed in top plan, the front end of the headlamp 47 projects forwardly farther than rear ends of the left and right position lamps 48L and 48R.

The left and right position lamps 48L and 48R are accommodated in a front portion of the left side portion 40L and the right side portion 40R of the front cowl 40, respectively, such that the irradiation faces thereof described hereinabove are exposed to the outside. Here, referring to FIG. 21, as viewed in top plan, inner side wall portions, positioned on the inner side in the vehicle widthwise direction, of the accommodation portion 49L of the left side portion 40L and the accommodation portion 49R of the right side portion 40R of the front cowl 40 extend to the inner side in the vehicle widthwise direction toward the front along a front portion of the front fender 6 formed in a tapering shape toward the front. The housing 48LH of the position lamp 48L described hereinabove is accommodated in the front portion of the left side portion 40L such that it extends along the inner side wall portion of the left side portion 40L positioned on the inner side in the vehicle widthwise direction. It is to be noted that also the housing 48RH of the right position lamp 48R is configured similarly. Further, though not shown, a hole is formed in and extends forwardly through the front portion inner walls of the recessed portions 80L and 80R of the accommodation portions 49L and 49R. Position valves of the left and right position lamps 48L and 48R can be mounted and removed through the holes.

Referring to FIGS. 3 and 22, as viewed in front elevation, the headlamp 47 is formed in a substantially isosceles triangle which is convex downwardly. In the present embodiment, the inner side wall portions positioned on the inner side in the vehicle widthwise direction of the accommodation portion 49L of the left side portion 40L of the front cowl 40 and the accommodation portion 49R of the right side portion 40R of the front cowl 40 extend along the isosceles of the headlamp 47 of the substantially isosceles triangle as viewed in front elevation. As described hereinabove, the left and right position lamps 48L and 48R partly overlap with an angular portion on the upper side of the headlamp 47 in the upward and downward direction with reference to the straight lines L5 and L6 as viewed in front elevation.

As described above, in the motorcycle 1 according to the present embodiment, the accommodation portions 49L and 49R provided in the front cowl 40 are disposed in a left and right pair. Further, the wind inlet portion 39S of the windscreen 39 provided so as to extend upwardly from the front cowl 40 is disposed between the left and right accommodation portions 49L and 49R. In such a structure as just described, the accommodation portions 49L and 49R are disposed so as to be distributed to the left and the right on the front cowl 40. Therefore, even where the accommodation portions 49L and 49R are provided in the front cowl 40, the wind inlet portion 39S can be formed readily at a central position in the vehicle widthwise direction between the left and right accommodation portions 49L and 49R. Consequently, an aerodynamic performance and a cooling performance can be assured favorably.

Further, in the motorcycle 1, the seat S is disposed behind the front cowl 40, and the front cowl 40 includes, at the rear end thereof (rear end of the rear portion 40B), the cowl extending portion 40BE which extends to the front end of the seat S. By this structure, an impact can be provided to the design.

Further, in the motorcycle 1, the accommodation portions 49L and 49R are configured from the recessed portions 80L and 80R formed on the front cowl 40 and recessed downwardly to form accommodation spaces, and the lids 81L and 81R which cover the recessed portions 80L and 80R from above so that the recessed portions 80L and 80R can be opened and closed, respectively. By this structure, the lids 81L and 81R can be opened to open the accommodation spaces upwardly, and therefore, the operability of the accommodation portions 49L and 49R can be promoted.

Further, in the motorcycle 1, the lids 81L and 81R can be opened or closed by the hinges 82 provided on the inner walls of the recessed portions 80L and 80R positioned on the inner side in the vehicle widthwise direction. By this structure, the lids 81L and 81R can be opened and closed from the outer sides in the vehicle widthwise direction. Consequently, the operability of the accommodation portions 49L and 49R can be improved.

Further, in the motorcycle 1, the accommodation portions 49L and 49R are formed such that the size thereof in the vehicle widthwise direction increases toward the rear as viewed in top plan. Further, the side mirrors Mi are attached to the front cowl 40 behind the rear portions of the accommodation portions 49L and 49R.

By the structure described, the outer shape of the front cowl 40 can be made a streamlined shape from the side to the rear of the accommodation portions 49L and 49R so as to suppress the aerodynamic drag. Further, since the side mirrors Mi are attached to the positions spaced to the left and the right from the center in the vehicle widthwise direction, the visibility of the side mirrors Mi can be assured. Further, since the side mirrors Mi are attached efficiently utilizing part of the front cowl 40, for example, stays for the side mirrors Mi can be eliminated to achieve reduction of the number of parts and miniaturization. Further, also it is possible to cause outer side portions of the front cowl 40 in the vehicle widthwise direction to function as knuckle guards. Consequently, the number of parts can be reduced and an impact can be provided to the design.

Further, in the motorcycle 1, the side stand 90 is provided on the left in the vehicle widthwise direction, and the electric component 91 is disposed on the left accommodation portion 49L. Therefore, when the vehicle tilts to the left in the vehicle widthwise direction by being supported by the side stand 90, the operability when maintenance of the electric component 91 is carried out on the tilted side can be improved. It is to be noted that the electric component 91 in the present embodiment is a relay.

Although the embodiment of the present invention has been described, the present invention is not limited to the specific embodiment, but various modifications can be made without departing from the subject matter of the present invention. For example, while the left side portion 40L and the right side portion 40R of the front cowl 40 are configured in a spaced relationship from each other in the vehicle widthwise direction, they may otherwise be connected to each other.

Further, the side stand 90 may be provided on the right in the vehicle widthwise direction such that an erected state of the vehicle is maintained by the side stand 90 in a state in which the vehicle tilts to the right.

Further, while the under cowls 44L and 44R can be divided from each other to the left and the right, they may otherwise be integrated with each other in the leftward and rightward direction.

Further, the receiving portion 67 may project or not project upwardly from the receiving portion opening 68.

Further, while the swelling portions 44LP and 44RP are provided on the left and the right, respectively, one of them may be provided on only one of the left and right under cowls 44L and 44R.

Further, while it is described that the position lamps 48L and 48R in the embodiment described above serve also as blinkers, blinkers having only a function for direction indication may be provided at the positions of the position lamps 48L and 48R.

Further, it is described that, in the embodiment described above, the left and right position lamps 48L and 48R are disposed such that, as viewed in front elevation, they sandwich the headlamp 47 therebetween and at least partly overlap with at least part of the headlamp 47 in the upward and downward direction. However, as viewed in front elevation, the left and right position lamps 48L and 48R may not at least partly overlap with at least part of the headlamp 47 in the upward and downward direction. However, where the left and right position lamps 48L and 48R are disposed in such a manner as to at least partly overlap with at least part of the headlamp 47 in the upward and downward direction, this is preferable in that the members are aggregated.

Further, in the embodiment described hereinabove, as viewed in front elevation, the left and right position lamps 48L and 48R are disposed in such a manner as to sandwich the headlamp 47 therebetween and besides are disposed such that the upper end portions thereof are positioned higher than the lower end portion of the headlamp 47. However, the left and right position lamps 48L and 48R may not be disposed such that the upper end portions thereof are positioned higher than the lower end portion of the headlamp 47 as in the embodiment described, but may be disposed such that the upper end portions thereof are positioned lower than the lower end portion of the headlamp 47.

Further, in the embodiment described above, the left and right position lamps 48L and 48R are disposed at positions on the lower side of the headlamp 47 (at positions lower than the central portion in the upward and downward direction). However, the left and right position lamps 48L and 48R may be disposed otherwise at positions on the upper side of the headlamp 47.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A saddle type vehicle, comprising:
   a vehicle body frame;
   a steering shaft supported for rotation at a front end of said vehicle body frame and configured to steer a front wheel;
   a front cowl disposed around said steering shaft and covering a front portion of a vehicle body;
   a pair of accommodation portions provided in the front cowl; and
   a windscreen erected uprightly from said front cowl,
   wherein said pair of accommodation portions are disposed in a left and right pair,
   wherein a wind inlet portion is disposed between said left and right accommodation portions, in a vehicle widthwise direction, and
   wherein said pair of accommodation portions each include
       a recessed portions formed in said front cowl and recessed downwardly to form an accommodation space, and
       a lid mounted for opening and closing movement and configured to cover said recessed portions from above.

2. The saddle type vehicle according to claim 1, wherein said lid is mounted for opening and closing movement by a hinge provided on an inner wall of said recessed portion, positioned on the inner side in the vehicle widthwise direction.

3. A saddle type vehicle, comprising:
a vehicle body frame;
a steering shaft supported for rotation at a front end of said vehicle body frame and configured to steer a front wheel;
a front cowl disposed around said steering shaft and covering a front portion of a vehicle body;
a pair of accommodation portions provided in the front cowl; and
a windscreen erected uprightly from said front cowl,
wherein said pair of accommodation portions are disposed in a left and right pair,
wherein a wind inlet portion is disposed between said left and right accommodation portions, in a vehicle widthwise direction,
wherein said pair of accommodation portions are formed such that a dimension thereof, in the vehicle widthwise direction, increases toward a vehicle rear, as viewed in top plan, and
wherein side mirrors are attached to said front cowl behind rear portions of said pair of accommodation portions.

4. The saddle type vehicle according to claim 1,
wherein said pair of accommodation portions are formed such that a dimension thereof, in the vehicle widthwise direction, increases toward a vehicle rear, as viewed in top plan, and
wherein side mirrors are attached to said front cowl behind rear portions of said pair of accommodation portions.

5. The saddle type vehicle according to claim 2,
wherein said pair of accommodation portions are formed such that a dimension thereof, in the vehicle widthwise direction, increases toward a vehicle rear, as viewed in top plan, and
wherein side mirrors are attached to said front cowl behind rear portions of said pair of accommodation portions.

6. A saddle type vehicle, comprising:
a vehicle body frame;
a steering shaft supported for rotation at a front end of said vehicle body frame and configured to steer a front wheel;
a front cowl disposed around said steering shaft and covering a front portion of a vehicle body;
a pair of accommodation portions provided in the front cowl; and
a windscreen erected uprightly from said front cowl,
wherein said pair of accommodation portions are disposed in a left and right pair,
wherein a wind inlet portion is disposed between said left and right accommodation portions, in a vehicle widthwise direction,
wherein a seat is disposed behind said front cowl, and
wherein said front cowl has, at a rear end thereof, a cowl extending portion which extends to a front end of said seat.

7. The saddle type vehicle according to claim 1,
wherein a seat is disposed behind said front cowl, and
wherein said front cowl has, at a rear end thereof, a cowl extending portion which extends to a front end of said seat.

8. The saddle type vehicle according to claim 2,
wherein a seat is disposed behind said front cowl, and
wherein said front cowl has, at a rear end thereof, a cowl extending portion which extends to a front end of said seat.

9. The saddle type vehicle according to claim 3,
wherein a seat is disposed behind said front cowl, and
wherein said front cowl has, at a rear end thereof, a cowl extending portion which extends to a front end of said seat.

10. The saddle type vehicle according to claim 4,
wherein a seat is disposed behind said front cowl, and
wherein said front cowl has, at a rear end thereof, a cowl extending portion which extends to a front end of said seat.

11. The saddle type vehicle according to claim 5,
wherein a seat is disposed behind said front cowl, and
wherein said front cowl has, at a rear end thereof, a cowl extending portion which extends to a front end of said seat.

12. A saddle type vehicle, comprising:
a vehicle body frame;
a steering shaft supported for rotation at a front end of said vehicle body frame and configured to steer a front wheel;
a front cowl disposed around said steering shaft and covering a front portion of a vehicle body;
a pair of accommodation portions provided in the front cowl; and
a windscreen erected uprightly from said front cowl,
wherein said pair of accommodation portions are disposed in a left and right pair,
wherein a wind inlet portion is disposed between said left and right accommodation portions, in a vehicle widthwise direction,
wherein a side stand is provided on one of a left vehicle side and a right vehicle side, in the vehicle widthwise direction, and
wherein an electric component is disposed in one of said pair of accommodation portions which is on a same one of the left vehicle side and the right vehicle side on which said side stand is provided.

13. The saddle type vehicle according to claim 1,
wherein a side stand is provided on one of a left vehicle side and a right vehicle side, in the vehicle widthwise direction, and
wherein an electric component is disposed in one of said pair of accommodation portions which is on a same one of the left vehicle side and the right vehicle side on which said side stand is provided.

14. The saddle type vehicle according to claim 2,
wherein a side stand is provided on one of a left vehicle side and a right vehicle side, in the vehicle widthwise direction, and
wherein an electric component is disposed in one of said pair of accommodation portions which is on a same one of the left vehicle side and the right vehicle side on which said side stand is provided.

15. The saddle type vehicle according to claim 3,
wherein a side stand is provided on one of the left and the right in the vehicle,
wherein a side stand is provided on one of a left vehicle side and a right vehicle side, in the vehicle widthwise direction, and
wherein an electric component is disposed in one of said pair of accommodation portions which is on a same one of the left vehicle side and the right vehicle side on which said side stand is provided.

16. The saddle type vehicle according to claim 4,
wherein a side stand is provided on one of a left vehicle side and a right vehicle side, in the vehicle widthwise direction, and wherein an electric component is disposed in one of said pair of accommodation portions which is on a same one of the left vehicle side and the right vehicle side on which said side stand is provided.

17. The saddle type vehicle according to claim 5,
wherein a side stand is provided on one of a left vehicle side and a right vehicle side, in the vehicle widthwise direction, and
wherein an electric component is disposed in one of said pair of accommodation portions which is on a same one of the left vehicle side and the right vehicle side on which said side stand is provided.

18. The saddle type vehicle according to claim 6,
wherein a side stand is provided on one of a left vehicle side and a right vehicle side, in the vehicle widthwise direction, and
wherein an electric component is disposed in one of said pair of accommodation portions which is on a same one of the left vehicle side and the right vehicle side on which said side stand is provided.

19. The saddle type vehicle according to claim 7,
wherein a side stand is provided on one of a left vehicle side and a right vehicle side, in the vehicle widthwise direction, and
wherein an electric component is disposed in one of said pair of accommodation portions which is on a same one of the left vehicle side and the right vehicle side on which said side stand is provided.

* * * * *